United States Patent [19]

Obata et al.

[11] Patent Number: 5,726,669

[45] Date of Patent: Mar. 10, 1998

[54] MULTI-WINDOW COMMUNICATION SYSTEM

[75] Inventors: Akihiko Obata, Mitaka; Hajime Kamata, Kawasaki; Katsutoshi Yano, Tokyo; Motomitsu Adachi, Chigasaki, all of Japan

[73] Assignee: Fujitsu Limited, Kawasaki, Japan

[21] Appl. No.: 640,678

[22] Filed: May 1, 1996

Related U.S. Application Data

[63] Continuation of Ser. No. 292,751, Aug. 18, 1994, abandoned, which is a continuation of Ser. No. 947,952, Sep. 21, 1992, abandoned, which is a continuation of Ser. No. 465,217, Feb. 14, 1990, abandoned.

[30] Foreign Application Priority Data

Jun. 20, 1988 [JP] Japan ................ 63-149975
Sep. 20, 1988 [JP] Japan ................ 63-233502

[51] Int. Cl.⁶ .................................................. G09G 5/00
[52] U.S. Cl. ............................ 345/2; 345/119; 395/332
[58] Field of Search ............................ 345/1, 2, 3, 56, 345/118, 119, 120, 121, 123, 124, 125; 395/118, 329–332, 340, 341, 343, 344, 346

[56] References Cited

U.S. PATENT DOCUMENTS

| | | | |
|---|---|---|---|
| 4,386,410 | 5/1983 | Pandya et al. | 340/726 |
| 4,414,621 | 11/1983 | Bown et al. | 395/153 |
| 4,437,093 | 3/1984 | Bradley | 340/726 |
| 4,633,415 | 12/1986 | Vink et al. | 364/521 |
| 4,692,757 | 9/1987 | Tsuhara et al. | 340/721 |
| 4,714,918 | 12/1987 | Barker et al. | |
| 4,769,762 | 9/1988 | Tsujido | 340/721 |
| 4,794,386 | 12/1988 | Bedrij et al. | 340/726 |
| 4,860,218 | 8/1989 | Sleator | 364/521 |
| 4,881,179 | 11/1989 | Vincent | 364/521 |
| 4,903,013 | 2/1990 | Takeda | 340/726 |
| 4,974,173 | 11/1990 | Stefik et al. | 340/721 |

FOREIGN PATENT DOCUMENTS 3520285 12/1985 Germany.
2139042 10/1984 United Kingdom.

OTHER PUBLICATIONS

Hasui, Kouya; "Man–Machine Interfaces in Office Communication Systems", IEEE Communications Mag. vol. 24, No. 7, Jul. 1986 pp. 18–23.

Lisa Draw; Apple Computer, Inc.; copyright 1984; pp. 80–83.

Primary Examiner—Steven Saras
Attorney, Agent, or Firm—Staas & Halsey

[57] ABSTRACT

A multi-window communication system performs a communication and telewriting between terminals having multi-window functions. This system inputs commands for a window frame change, a screen scrolling and various function execution designation, and analyzes and executes a command inputted by said inputting means and transmitted from another terminal. It displays window display data stored in a memory under the control of a command analysis, and transmits and receives transmitting and receiving signals to or from another terminal, under the control of a command analysis. Then, the system maintains window management data, changes a window frame and controls a scrolling of a window screen, under the control of the command analysis.

77 Claims, 45 Drawing Sheets

ORIGINATING TERMINAL

DESTINATION TERMINAL

ORIGINATING TERMINAL

DESTINATION TERMINAL

ORIGINATING TERMINAL

DESTINATION TERMINAL

ORIGINATING TERMINAL

DESTINATION TERMINAL

ORIGINATING TERMINAL

DESTINATION TERMINAL

ORIGINATING TERMINAL

DESTINATION TERMINAL

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | LOCAL | UNUSED |
| M2 | W2 | x2 | y2 | W2 | H2 | LOCAL | UNUSED |
| M3 | UNUSED | UNUSED | | | | UNUSED | UNUSED |

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | LOCAL | UNUSED |
| M2 | W2 | x2 | y2 | W2 | H2 | LOCAL | UNUSED |
| M3 | UNUSED | UNUSED | | | | UNUSED | UNUSED |

Fig. 25A

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | IN COMMUNICATION | PM3 |
| M2 | W2 | x2 | y2 | W2 | H2 | LOCAL | UNUSED |
| M3 | USED | USED | | | | UNUSED | UNUSED |

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | LOCAL | UNUSED |
| M2 | W2 | x2 | y2 | W2 | H2' | LOCAL | UNUSED |
| M3 | W3 | x3 | y3 | W3 | H3 | IN COMMUNICATION | PM1 |

Fig. 25 B

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | IN COMMUNICATION | PM3 |
| M2 | W2 | x2 | y2 | W2 | H2' | LOCAL | UNUSED |
| M3 | W3 | x3 | y3 | W3 | H3 | IN COMMUNICATION | PM1 |

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | IN COMMUNICATION | PM3 |
| M2 | W2 | x2 | y2 | W2 | H2' | LOCAL | UNUSED |
| M3 | W3 | x3 | y3 | W3 | H3 | IN COMMUNICATION | PM1 |

Fig. 25C

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | UNUSED | UNUSED | | | | UNUSED | UNUSED |
| M2 | W2 | x2 | y2 | W2 | H2' | LOCAL | UNUSED |
| M3 | W3 | x3 | y3 | W3 | H3' | IN COMMUNICATION | PM1 |

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | IN COMMUNICATION | PM3 |
| M2 | W2 | x2 | y2 | W2 | H2' | LOCAL | UNUSED |
| M3 | W3 | x3 | y3 | W3 | H3 | LOCAL | UNUSED |

Fig. 25D

| MEMORY ADDRESS | WINDOW NUMBER | DISPLAY PARAMETER | | | COMMUNICATION STATUS | THE OTHER PARTY MEMORY ADDRESS |
|---|---|---|---|---|---|---|
| M1 | W1 | x1 y1 | W1 | H1 | LOCAL | UNUSED |
| M2 | W2 | x2 y2 | W2 | H2' | LOCAL | UNUSED |
| M3 | W3 | x3 y3 | W3 | H3" | IN COMMUNICATION | PM1 |

| MEMORY ADDRESS | WINDOW NUMBER | DISPLAY PARAMETER | | | COMMUNICATION STATUS | THE OTHER PARTY MEMORY ADDRESS |
|---|---|---|---|---|---|---|
| M1 | W1 | x1 y1 | W1 | H1 | IN COMMUNICATION | PM3 |
| M2 | W2 | x2 y2 | W2 | H2' | LOCAL | UNUSED |
| M3 | W3 | x3 y3 | W3 | H3 | LOCAL | UNUSED |

Fig. 25E

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | LOCAL | UNUSED |
| M2 | W2 | x2 | y2 | W2 | H2' | LOCAL | UNUSED |
| M3 | W3 | x3 | y3 | W3 | H3" | IN COMMUNICATION | PM1 |

| MEMORY ADDRESS | WINDOW NUMBER | DISPLAY PARAMETER | | | | COMMUNICATION STATUS | THE OTHER PARTY MEMORY ADDRESS |
|---|---|---|---|---|---|---|---|
| M1 | W1 | x1 | y1 | W1 | H1 | IN COMMUNICATION | PM3 |
| M2 | UNUSED | UNUSED | | | | UNUSED | UNUSED |
| M3 | W3 | x3 | y3 | W3 | H3' | LOCAL | UNUSED |

Fig. 25F

MULTI-WINDOW COMMUNICATION SYSTEM

This application is a continuation, of application Ser. No. 08/292,751, filed Aug. 18, 1994, now abandoned, which is a continuation of Ser. No. 07/947,952 filed Sep. 21, 1992, now abandoned, which is a continuation of Ser. No. 07/465,217, filed Feb. 14, 1990, now abandoned.

BACKGROUND ART

The present invention relates to a multi-window display communication terminal for displaying a plurality of independent rectangular screens (windows) on a display screen, and more particularly to a control apparatus for controlling a multi-window telewriting service using a plurality of variable rectangular windows whose frames can be optionally changed by a user.

Recently, a highly developed communication system has been developed for ISDN. As a basic rate interface between network and terminal, 2B+D (64 K+64 K+16 K bps) is determined, and a highly developed communication service has been reviewed to fully utilize the 2B+D interface. In these circumstances, a voice can be transmitted by using one B channel, and multi-media documentary information including text, image data, graphics and hand-drawing data are transmitted by another B channel. A conversation is performed by voice, and underlines or comments are written onto a document displayed on a communication terminal, or a part of a document is designated by a cursor. Audio-graphic conference service has been proposed based on a telewriting (image plotting) service.

On the other hand, it is desired to provide a communication terminal with a multi-window display function. This terminal is adopted, for example, at a work-station, in order to increase its usability. According to a multi-window display, a plurality of rectangular areas of a discretional size are provided on a screen and a part of the image information, such as documentary information, is cut out or displayed. By using this function, a plurality of documents can be displayed simultaneously on a screen. By realizing a multi-media communication service based on the above-recited telewriting on a window, the usability of the system at a communication terminal can be increased. Further, the demand for telewriting based on a document displayed in a plurality of windows, i.e. the demand for a multi-window telewriting is increasing.

In a telewriting service, the document first referred to is transmitted to another terminal in a batch and displayed. Then, by using a pointing device such as an input-pen, a communication is conducted by voice with the other party and a telewriting service is conducted on the displays at both terminals. Handwriting data is sequentially transmitted between them and is displayed on the original screen as well as at the receiving terminal.

Where a multi-media communication is conducted using a telewriting image communication terminal, operation of terminals becomes relatively complicated and it is preferable that the operation output is suitable for the ability of each user and the design of object-oriented software is conducted for this purpose to satisfy a human interface with an unskilled user.

A conventional processing communication system is shown in FIG. 1. Reference numerals 1 and 2 are telewriting terminals, also referred to as A and B, and 3 is an exchange apparatus. The A and B terminals at 1 and 2, respectively, have bit map displays of 640×400 dots, for example, as their display apparatuses. Generally speaking, a display screen is too small for a practical telewriting service. Therefore, a virtual screen as shown in the FIG. 1 is considered. This screen is several times larger than the actual display screen, and is equal to the size of the document to be displayed. A part of the virtual screen is displayed on the actual screen and the portion to be displayed is scrolled up and down, right and left by operating a scroll button with an input-pen. When scrolling is conducted, the displayed portion of the document is made the same at both terminals. When one terminal is scrolled, it transmits a scroll request to the other terminal which, upon receiving the scroll request, performs the same amount of scrolling as the originating terminal. When the above service is to be carried out by using a multi-window system, the user may discretionally change the size of his window, making it different from that of the other terminal. In the case shown in FIG. 2, when the window of A terminal 1 is scrolled, the end of the document is already reached in a window of B terminal 2, so that no further scrolling is possible. Thus, it is not sufficient merely to send a scroll request to the other party. Namely, when the window of the other communication party cannot be scrolled any more, a complicated set of controls becomes necessary to handle the situation.

There may be document which one party doesn't want to show to the other party because of its secret nature, but wants to refer to during a meeting without showing it to the other party. Therefore it is necessary to see a document locally, to perform a local window function and to transmit document data in a batch to enable the other party to decide whether a window function should be conducted during communication. It is preferable to provide a multi-window telewriting system in which two such window functions are realized. FIG. 3, shows an example in which windows 4 and 7, and windows 5 and 8 are used for communication between A terminal 1 and B terminal 2 and window 6 is used locally at A terminal 1. In this case, the status of the windows of both terminals differs. Therefore the method of managing the windows during communication between the two terminals is important.

As relevant arts of the present invention, the following publications are presented. Japanese Laid Open Patent Disclosure (KOKAI), 63-291111 relates to an operation guidance output control system and discloses a structure of a telewriting terminal.

Japanese Laid Open Patent Disclosure (KOKAI), 63-67958 relates to a multi-window telewriting terminal and discloses a technology of detecting a size of a window and an area of a display of the other terminal by marking a frame of display screen of a telewriting terminal.

SUMMARY OF THE INVENTION

One object of the present invention is to provide a variable-frame-window communication terminal for easily carrying out smooth screen scrolling even when a communication is conducted with a terminal having a different window size from that of the home terminal.

Another object of the present invention is to provide smooth telewriting in which a part of a multi-window is used exclusively for a local window for displaying a document at the home terminal. The other plurality of windows can be used for a telewriting service with the other party.

FIG. 4 is a principle block diagram of the present invention. In the drawing, input means 10 of the multi-window communication terminal comprises, for example, an input-pen, a tablet or a key-board. Input means 10 receives change-of-window-frame, screen-scrolling and various function-designating commands which are input by a user. Command analyzing means 11 comprises, for example, a processor, which analyzes an input command and a command transmitted from the other terminal and carries it out.

Display means 12 comprises, for example, a display apparatus CRT. Window display data stored in a window memory is displayed on a screen of the display by a control of the command analysis means.

Transmitting and receiving means 13 transmits and receives signals such as a window screen scroll confirmation request to and from the other terminal. Window management means 14 maintains window management data such as vertical width and horizontal width of respective window frames in RAM and performs a window frame change and a window scroll, under control of command analysis means 11.

In a terminal of FIG. 4, input means 10 can receive a command of a plurality of window displays from a user and can receive a telewriting service command in case where it is used as a telewriting terminal. In these terminals, in addition to function of displaying a window display data stored in a window memory in a communication window used for a communication with the other terminal, the display means 12 can display the window display data in a local window which is used for a reference by only the local or home terminal. The display is not limited to a communication window and a local window and the window display data may be displayed in a plurality of windows.

Next, in these terminals, transmitting and receiving means 13 can transmit and receive signals for controlling a plurality of windows, signals designating a window used for the home terminal by a window number or memory address, the number of the window for telewriting image communication and the picture information to and from the other terminal.

Window management means 14 in these terminals can execute a window frame change and window screen scroll control independently from another window with regard to a plurality of windows and change a window frame to a discretional size within a vertical and horizontal width of the document and can perform scroll of a window screen in any one of upper, lower, right and left directions. Transmitting and receiving means 13 can manage a window by using the number of the communication window received from the other terminal and the picture information.

The method of managing a multi-window in a communication between two image telewriting terminals A and B is explained by referring to FIG. 4. For example, a user of A terminal 1 touches an icon for requesting a start of telewriting service on a display by using input means 10 such as an input-pen and designates a window for telewriting service. Then, the window number is analyzed by command analyzing unit 11, and telewriting request command is transmitted to B terminal 2 by transmitting and receiving means 13.

When B terminal 2 receives this command, it hunts an unused window, based on the content of window managing means 14, and returns the window number or the memory address of B terminal 2 to A terminal 1, thereby enabling the connection between the two windows to be set up. Upon the connection being set up, A terminal 1 transmits, the document data of its communication window and displays it on display means 12 on B terminal 2. Thereafter, users at both terminals perform telewriting and respective users sequentially transmit handwriting data to the other party. The handwriting data is input by an input-pen on a tablet on the display.

If necessary, the users at both terminals can also use another windows for telewriting service. In this case, the terminals inform each other of the appropriate communication window numbers, and a telewriting service is then conducted. Namely, different windows for performing communication are hunted but this hunting is conducted independently of a request for start of telewriting.

As described above, to enable to do telewriting service they must inform each other of the window number or the memory address to be used for the communication between the windows. A discretional number of the multi-windows are used for a communication with the other party and the remaining window can be used as a local window.

FIG. 4 shows a method of scrolling a window screen between the originating terminal and the destination terminal in a communication network in which a plurality of communication terminals or multi-window telewriting images are combined. In the present invention a scroll confirmation request is transmitted before screen scrolling is conducted. But a flag showing that the scrolling is now being confirmed is maintained in a window managing means 14. Window managing data is produced simultaneously by both terminals to avoid a collision between the confirmation requests.

With reference to FIG. 4, the user of A terminal 1 provides a scroll command to input means 10 and this command is analyzed by command analyzing unit 11. The window managing means determines, in accordance with the contents of said command analyzing unit 11, whether command analyzing unit 11 can scroll the window of the terminal. Window managing means 14 decides from the window managing data, whether or not a scrolling is possible. If it is, this is displayed to a user as a guidance display by display means 12. When it is judged that scrolling is possible, window managing means 14 turns on a scroll confirming flag, and transmitting and receiving means 13 provides a scrolling confirmation request. When B terminal 2 receives this confirmation demand, window managing means 14 determines, based on whether or not a scrolling confirmation flag is turned on, whether or not B terminal 2 should produce a prior scroll confirmation request. When the flag is turned on, this means that a collision of a scroll confirmation request occurs. Scroll-impossible data is provided to the A terminal 1 by transmitting and receiving means 13.

When the scroll confirming flag of B terminal 2 is off, window managing means 14 judges whether or not scrolling of the window at B terminal 2 is possible. If scrolling is impossible, a scroll-impossible message is sent to A terminal 1 as is similar to the above recitation.

When the window of B terminal 2 can perform a scrolling, display means 12 performs a scrolling of a window screen and transmitting and receiving means 13 replies simultaneously to A terminal 1 that scrolling is possible and A terminal 1 also performs screen scrolling on display means 12. The scrolling method of the present invention can be applied to a communication terminal having a single variable frame window function as well as a multi-window function communication terminal.

As described above, the present invention determines, before a window scrolling is carried out, whether or not a scrolling at the other terminal is possible.

Window management means 14 can judge whether or not window screen scroll is possible in accordance with scroll in a vertical or horizontal directions at any of the lowest limit, the upper limit, the left end, and the right end of the window screen.

BRIEF DESCRIPTION OF THE DRAWINGS

FIGS. 25A to 25F show the window management tables in communication, using the memory address as a parameter.

DESCRIPTION OF THE PREFERRED EMBODIMENT

Figure 1:
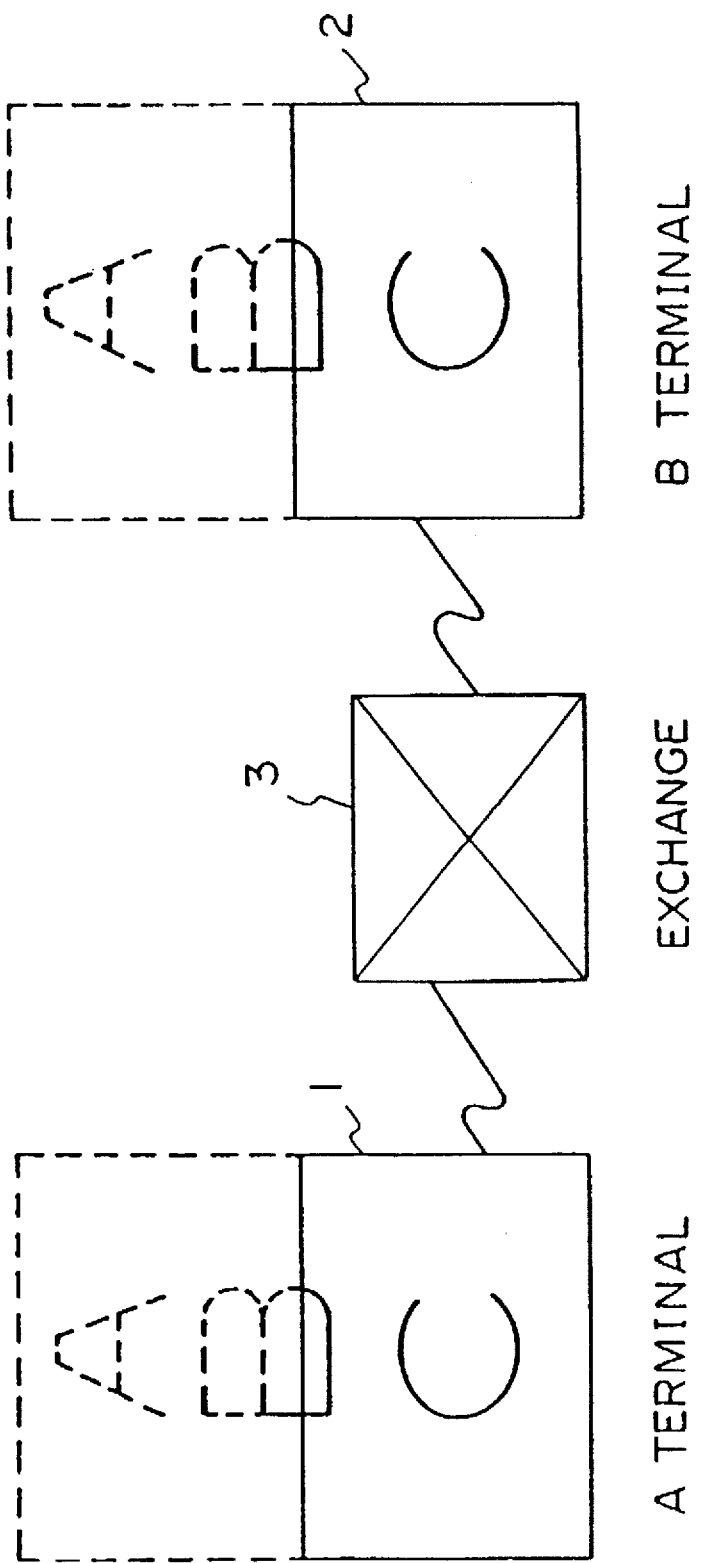
FIG. 1 shows a prior art telewriting service system.
Figure 2:
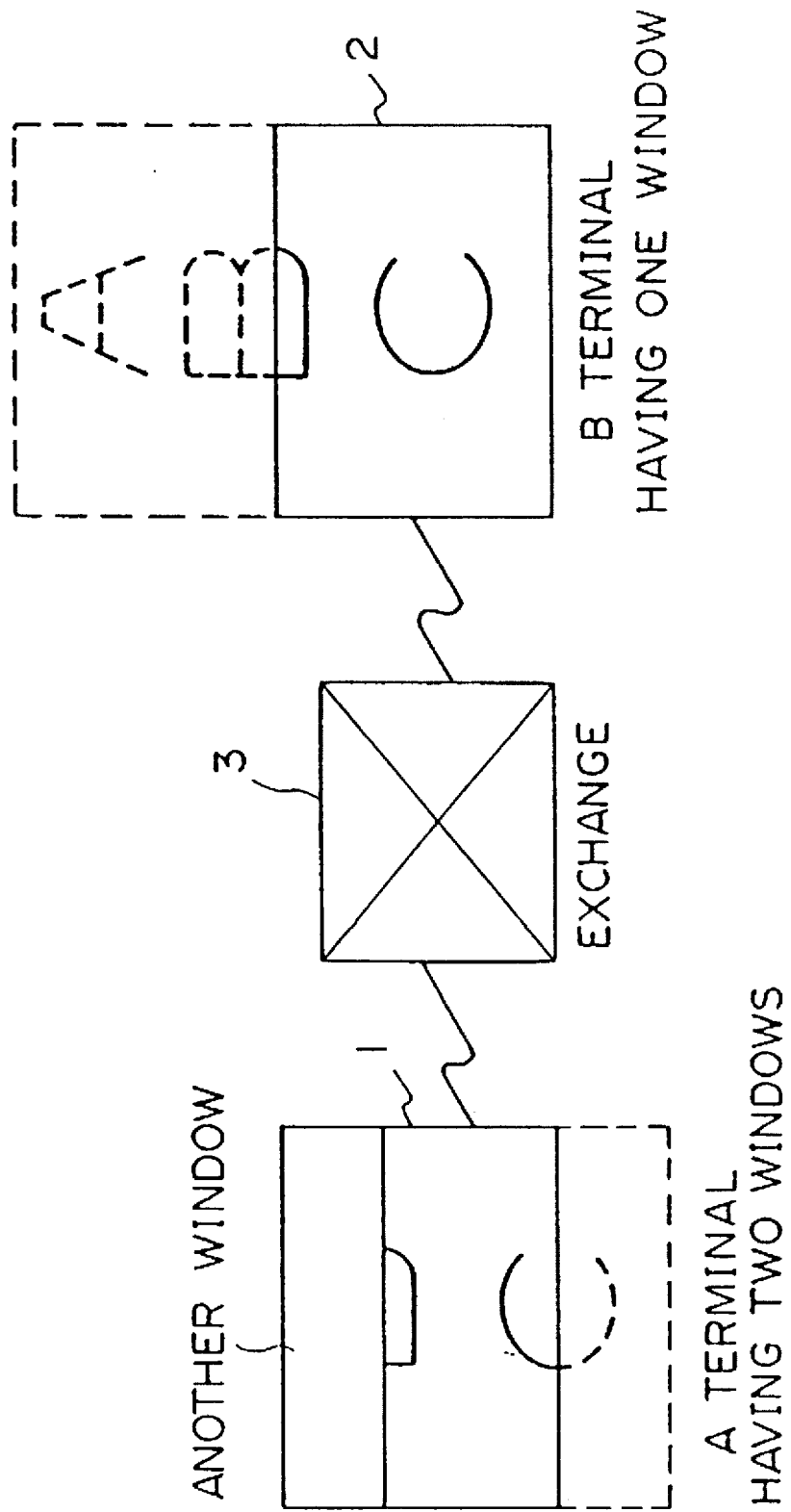
FIG. 2 shows an example of a screen scrolling when the window sizes are different.
Figure 3:
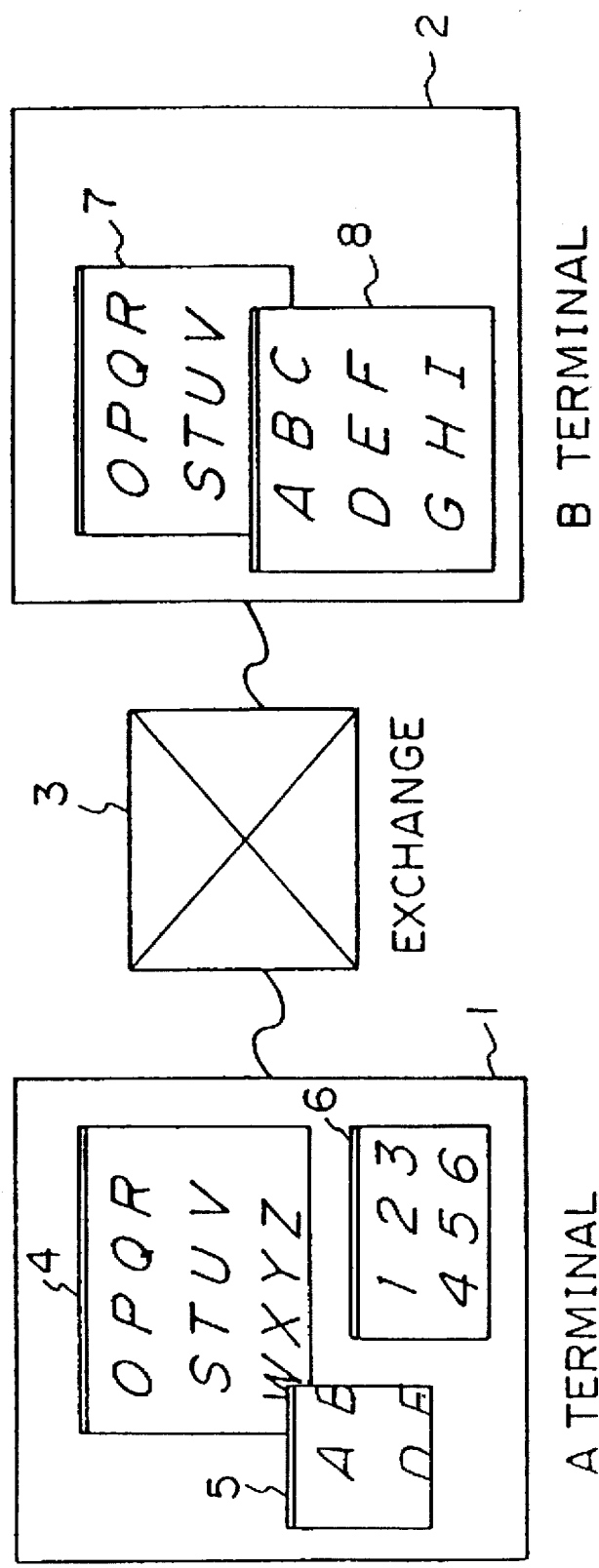
FIG. 3 is a block diagram of a multi-window telewriting system to which the present invention applies.
Figure 4:
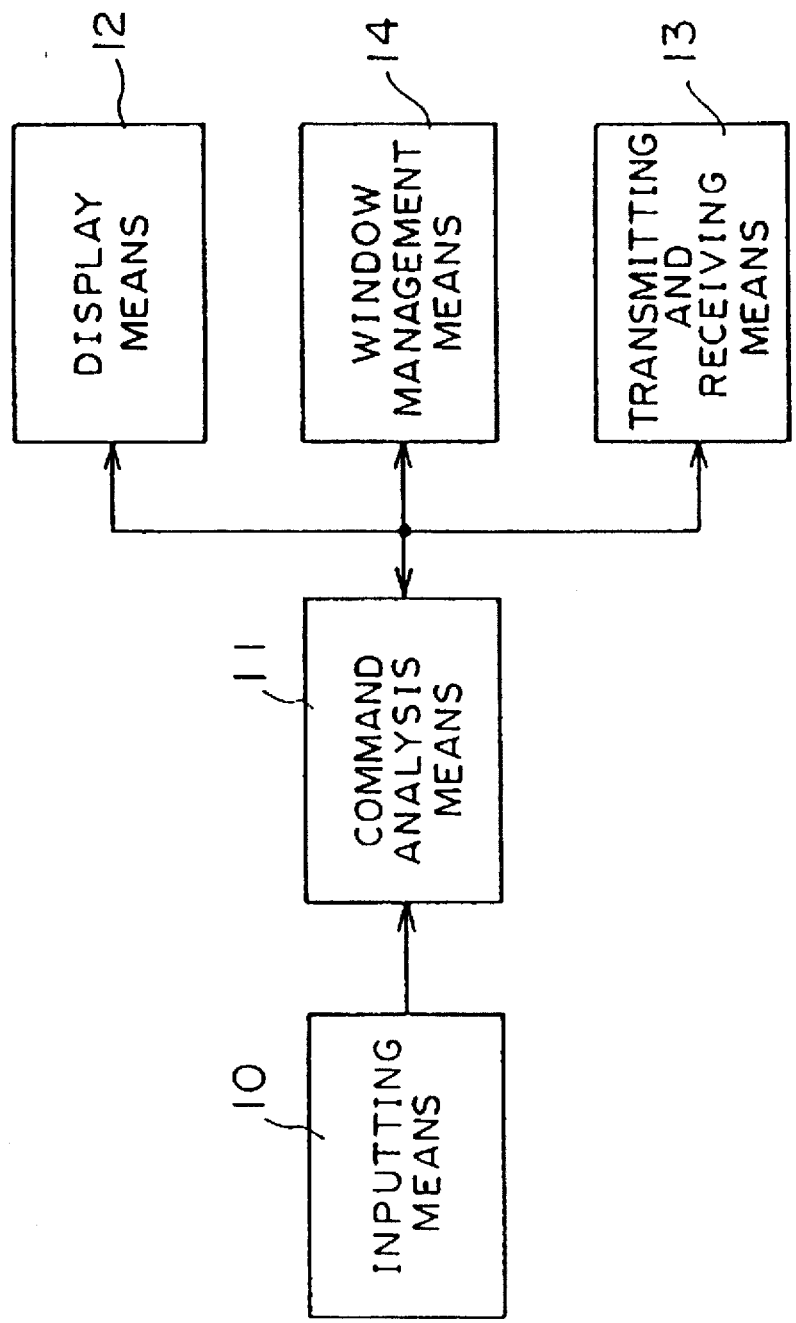
FIG. 4 is a principle block diagram of the present invention.

An embodiment of the present invention will be explained in detail by referring to the drawings.

Figure 5:
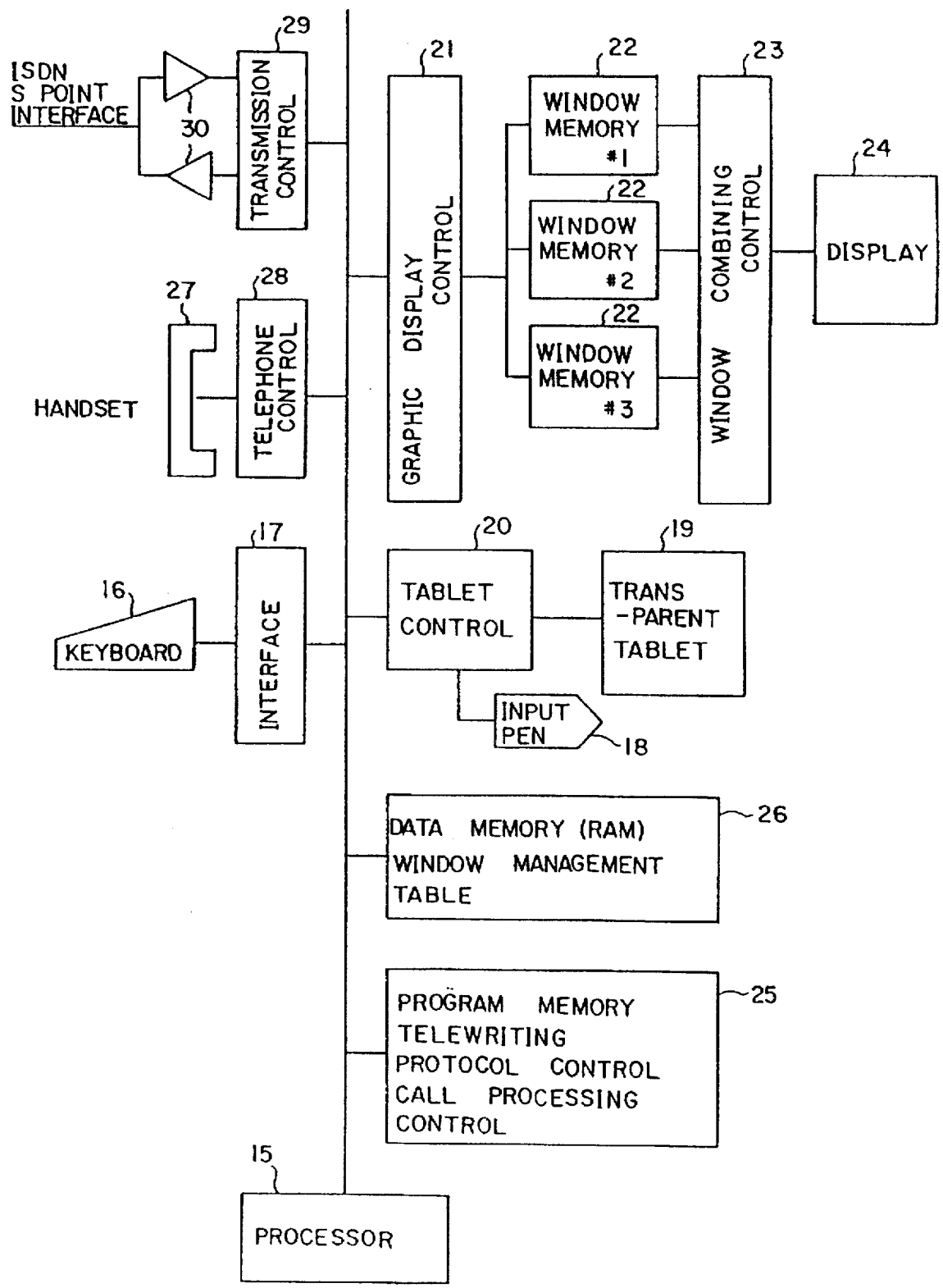
FIG. 5 is a block diagram of an embodiment comprising a multi-window telewriting terminal.

FIG. 5 shows a block diagram of an embodiment of a multi-window telewriting terminal according to the present invention. This terminal comprises a processor 15, a keyboard 16 and its interface 17, an input-pen 18 for inputting hand-drawing data, a transparent tablet 19, a tablet control unit 20, a graphic display control unit 21 for performing a display control on a display, a plurality of window memories (#1, #2, ...) 22 for storing hand-drawing data of respective windows among a multi-window, a window synthesizing control unit 23 for synthesizing the contents of a plurality of window memories, a display 24, a program memory (ROM) 25 for storing a program such as a telewriting protocol control and a calling processing control, a data memory (RAM) 26 including a window managing table as described later, for example, a hand-set 27 for voice communication, a telephone control means 28, a transmission control means 29 for controlling a data transmission, and a ISDN-point interface 30.

Display 24 comprises a liquid crystal display panel, an EL display panel, or a plasma display panel, and displays the contents of window memories 22. A transparent tablet 19 is provided on the display surface and contents of a display can be see through a transparent tablet 19. By contacting input-pen 18 onto the transparent tablet, an input can be conducted in accordance with a display content. Hand-drawing data is transmitted to the other terminal through transmission control means 29 and is also displayed on the display portion of the other terminal.

As described above, an exclusive window memory 22 is provided to each window of the multi-window, so that a telewriting can be simultaneously conducted for a plurality of windows. Thus, software processing cannot catch up with the telewriting of a super-imposition of the several windows upon display, and is controlled by window combining control unit 23 in a hardware manner.

Figure 6:
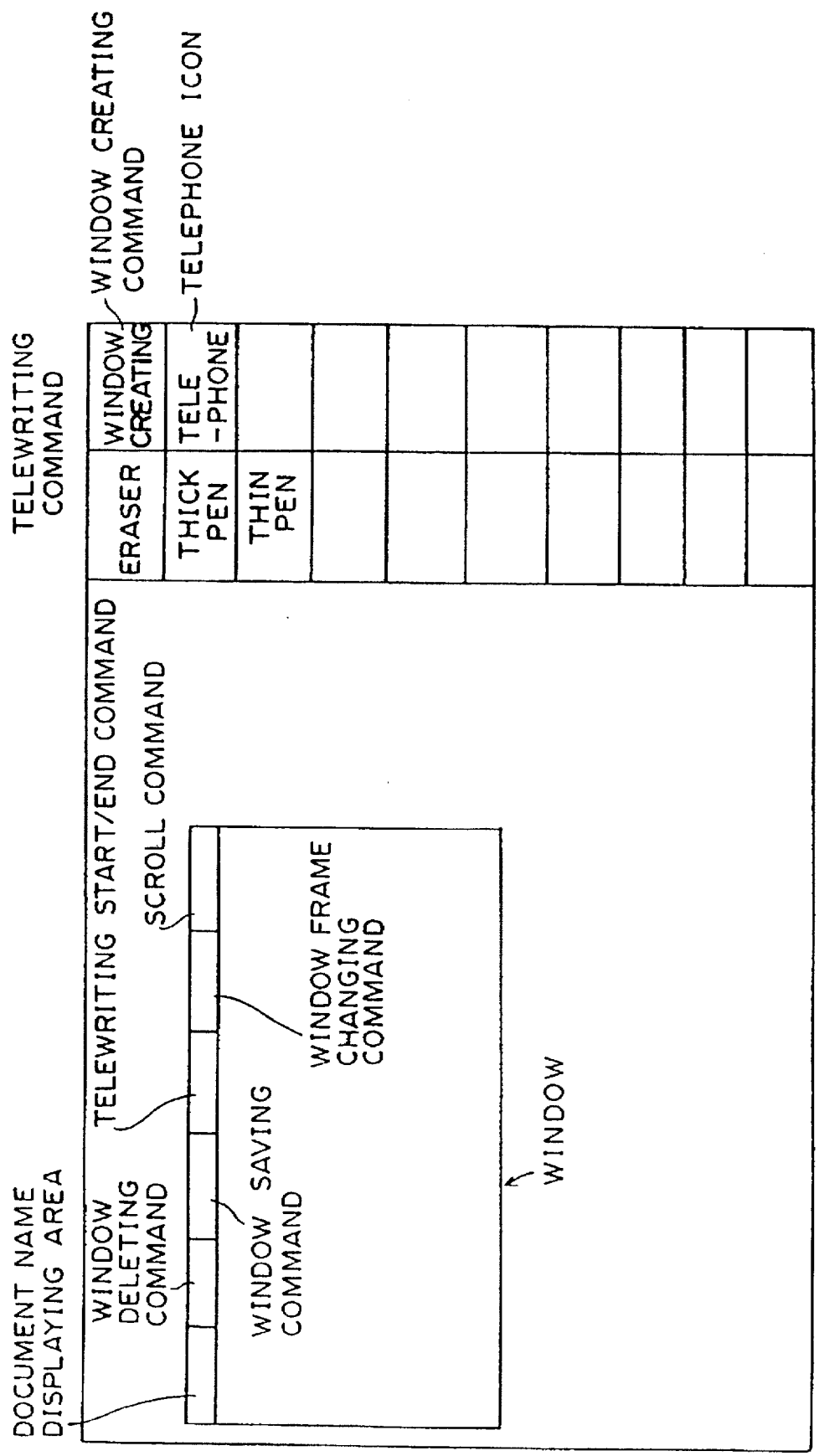
FIG. 6 shows the structure of one embodiment of a display.

FIG. 6 shows a structure of an embodiment of display 24. On the right side of the display, a window producing command, various icons such as telephone, icons for command for various telewriting such as eraser, thick pen, and thin pen are provided. On the upper most portion of the window display area, the document name is displayed and various icons, for example, for the input of the command for deleting a window are provided for instructing the document.

Figure 7:
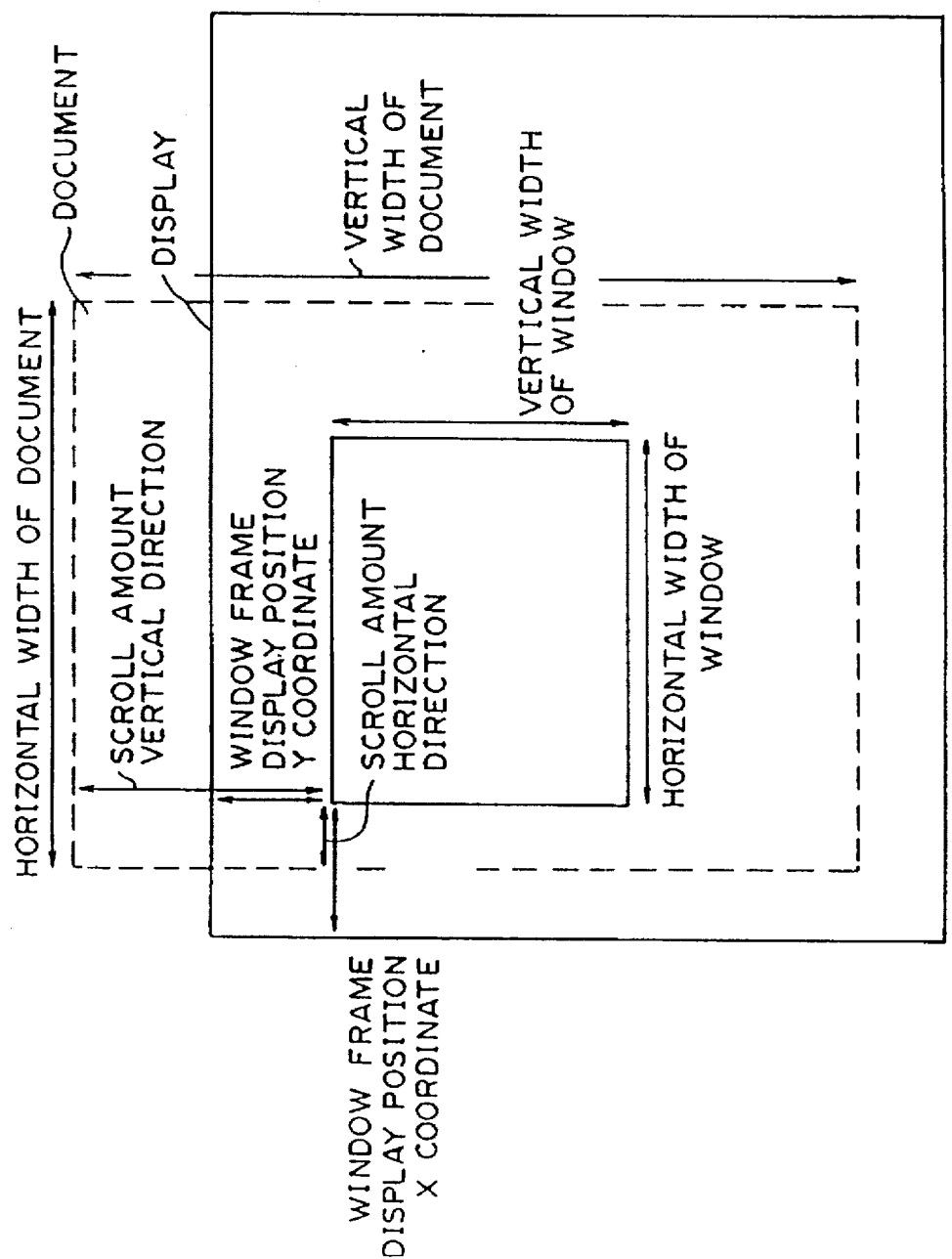
FIG. 7 is a view for explaining the scope of a document display in the window area.

FIG. 7 shows a relation between a document in a virtual space and a display scope of a document in a window area on an actual display. In FIG. 7, a point designated by a scroll amount (in a vertical and horizontal direction) on a document is designated at an upper left point and the scope of a vertical and horizontal width of the window is designated as being a window frame displaying position (X, Y coordinate) of a display on an upper left point. A window display priority is designated with regard to respective windows when the windows are overlapped.

Figure 8:
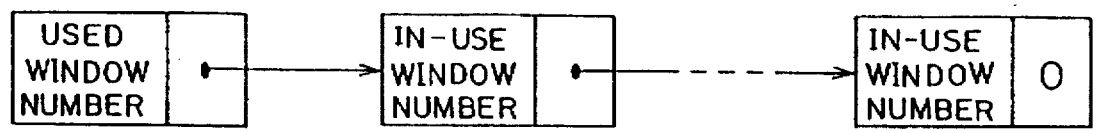
FIG. 8 shows the window management data.
Figure 8:
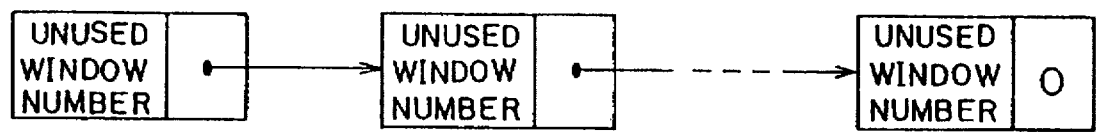
Figure 8:
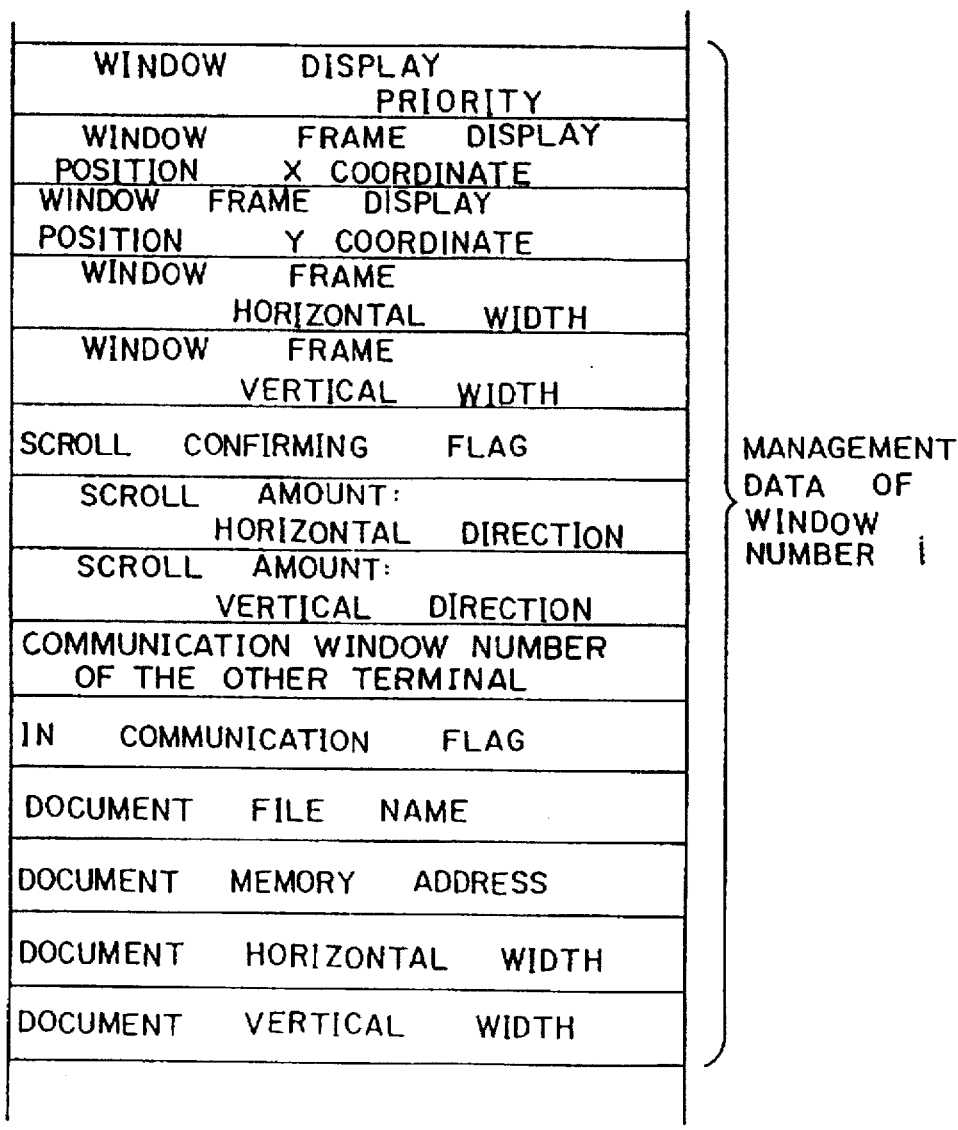

FIG. 8 shows the contents of window management data maintained in window management means 14. First of all, a list of window number designating windows that are in use and window numbers designating windows that are not yet in use is stored, for windows of a multi-window. Data for respective windows comprises window display priority, frame display position (X, Y coordinate), horizontal width and vertical width of the frame, flag for designating that the scroll is being confirmed, amount of screen scroll in a horizontal direction and vertical direction, the window number of a terminal of the other party for communication, flag for designating whether this window is in communication or not, file name of a document, and the address and vertical and horizontal width of the document. In multi-window display, these data are maintained for respective windows.

FIG. 9 shows a screen sequence in an embodiment of a multi-window telewriting service. In FIG. 9A, a user presses a telephone icon. In FIG. 9B, he dials the telephone number of an opposite party to get into a communication state with him. In FIG. 9C, the user opens a window on his own terminal by pressing a window-creating icon. In FIG. 9D, a document is written on the window, and in FIG. 9E, an icon for a command designating a start of telewriting is pressed to create a window on the other terminal and communication between windows is established.

Figure 9A:
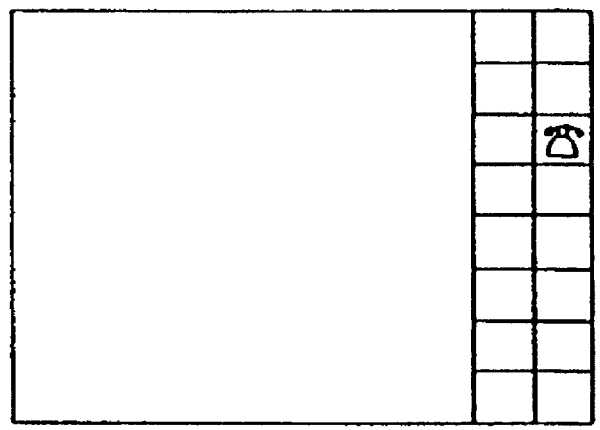
FIGS. 9A–9H are a sequence of screen displays corresponding to an embodiment of a multi-window telewriting service.
Figure 9B:
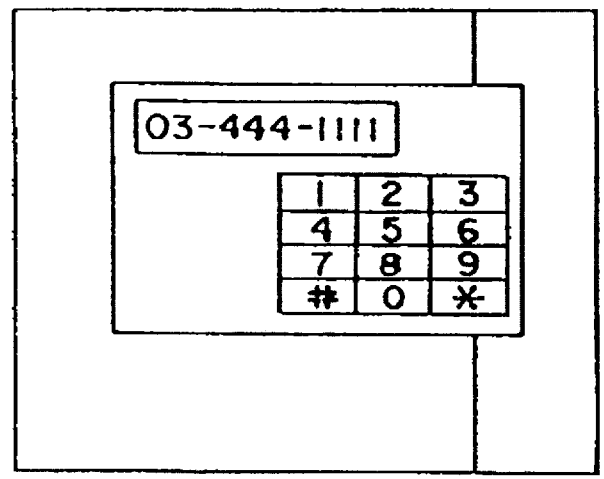
Figures 1, 9C:
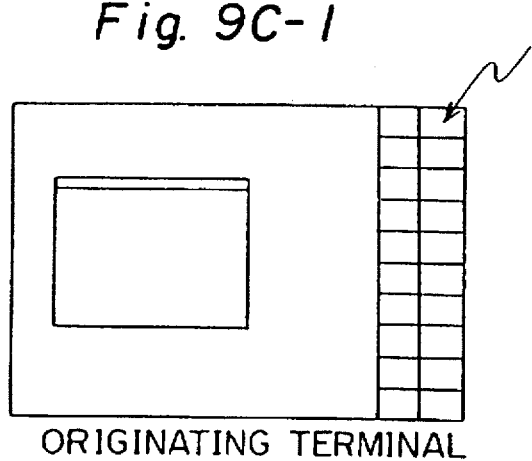
Figures 2, 9C:
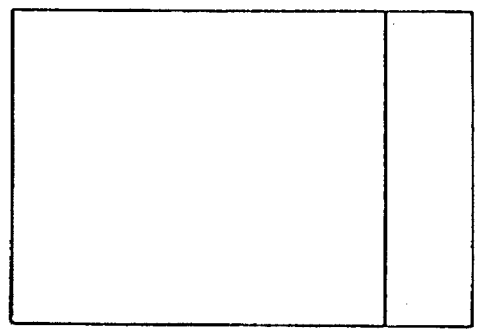
Figures 1, 9D:
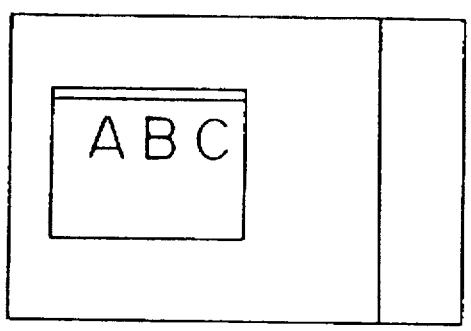
Figures 2, 9D:
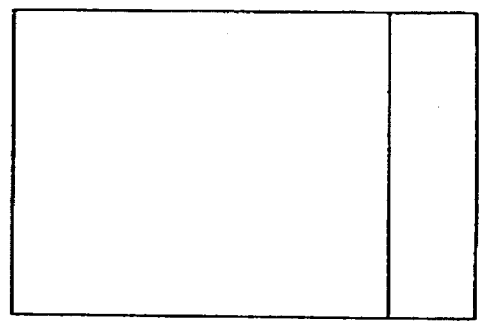
Figures 1, 9E:
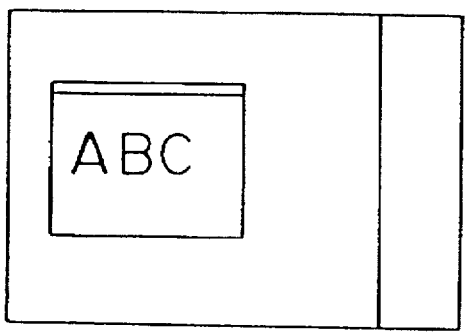
Figures 2, 9E:
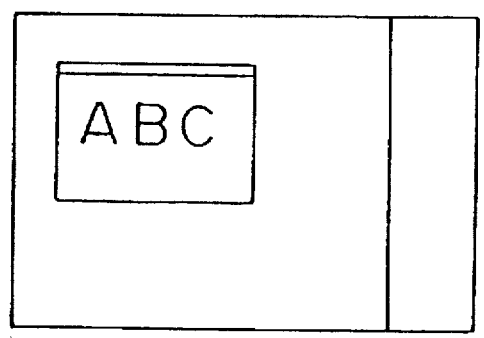
Figures 1, 9F:
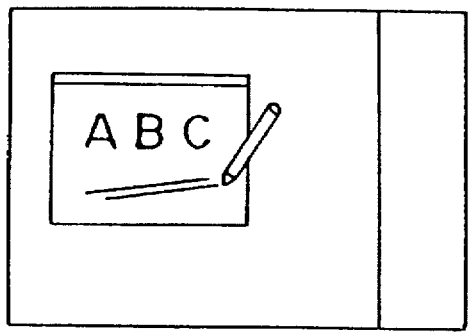
Figures 2, 9F:
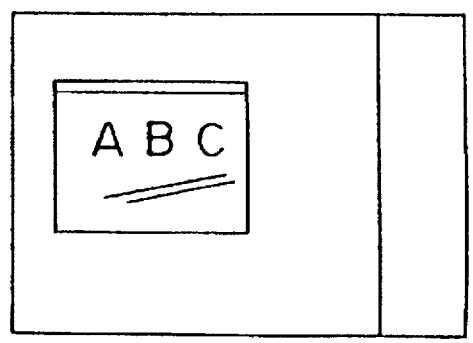
Figures 1, 9G:
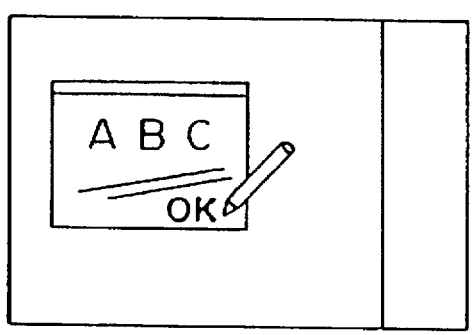
Figures 2, 9G:
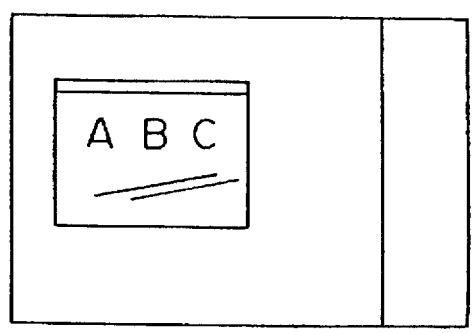
Figures 1, 9H:
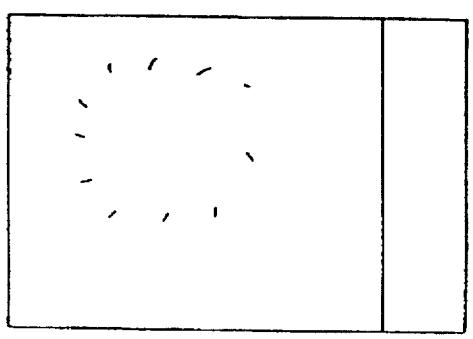
Figures 2, 9H:
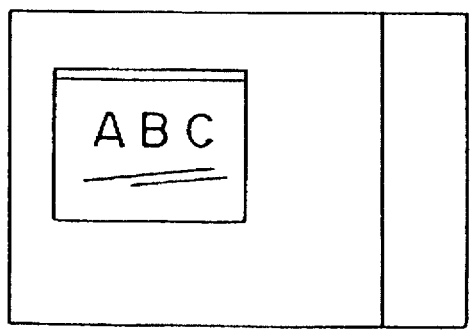

In FIG. 9F, hand-drawing data on the window is displayed at both terminals. In FIG. 9G, when the user inputs a command for completing a telewriting service using the window, the window enters a local state and the hand-drawing data at one terminal is not transmitted to the other terminal. In FIG. 9H, a command for designating a window cancellation or a window save is input, and then the window is deleted from the display.

Figure 10:
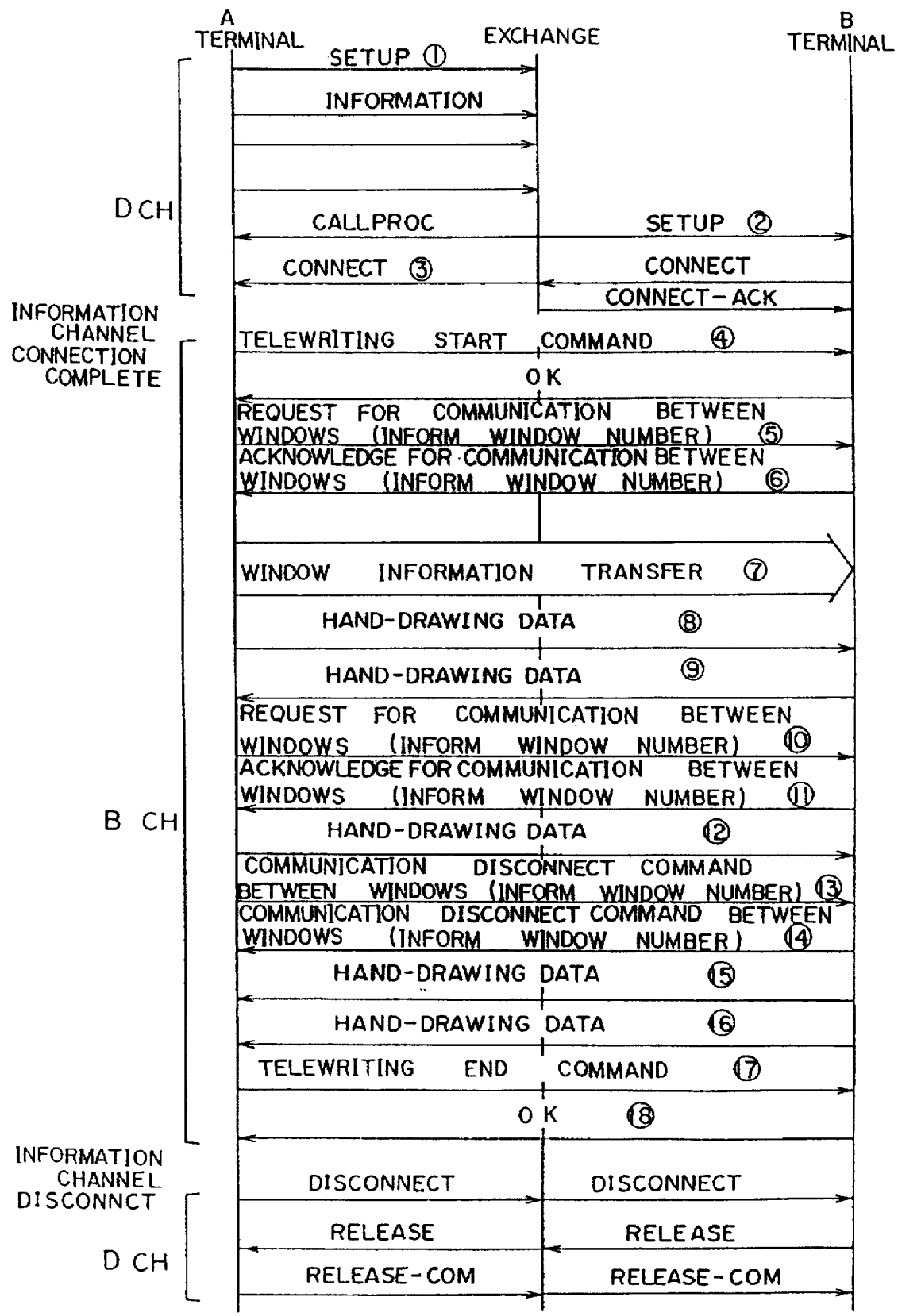
FIG. 10 shows a sequence of steps for multi-window telewriting service.

FIG. 10 shows an embodiment comprising a sequence of connecting terminals in which a telewriting is conducted between telewriting communication terminals as shown in FIG. 5.

In FIG. 10 a telewriting starts from an A terminal, for example, and set up ① is transmitted to an exchange from the A terminal via D-channel DCH. This reaches the B terminal as set up signal ②, and connect ③ is transmitted from the B terminal to the A terminal as a response, thereby completing connection of information channel.

Telewriting is carried out sequentially by B channel. When a telewriting starts, request ④ is transmitted from the A terminal to the B terminal by pressing, for example, a telewriting button. Request ⑤ for communication between windows to which the number of the communication window, for example W1, is attached, is transmitted. In response to this, the B terminal produces an acknowledge ⑥ of a communication between windows, and a communication window number, for example W3, at the B terminal is transmitted to the A terminal. Then the data on the window W1, namely, bit map data, is transmitted to the B terminal as window information, through a batch transmission ⑦ and hand-drawing data ⑧ and ⑨ are transmitted between the terminals by a telewriting method. If it becomes necessary to use a different window for a communication during telewriting, the A terminal again transmits a request for communication between windows ⑩ to the B terminal and the window number, for example, W2, used for the A terminal is informed. In response to this, the B terminal informs the A terminal of the window number in use, for example, W4, at ⑪ and thereafter the hand-drawing data ⑫ is transmitted from the A terminal.

When a communication using a certain window is stopped during the telewriting, request ⑬ for disconnecting a communication directed to a window W1 of the A terminal is transmitted from the A terminal to the B terminal. The B terminal returns the acknowledge for disconnecting the communication ⑭ directed to the B terminal, the window W3 being in communication with the window W1 of the A terminal.

On the other hand, window W2 of the A terminal is in communication with window W4 of the B terminal as the A terminals and B terminals get in communication with each other as shown in ⑩ and ⑪. Therefore, hand-drawing data ⑮ and ⑯ is transmitted from the B terminal and telewriting continues.

When telewriting is completed, the request for completion ⑰ is transmitted from the A terminal and the B terminal transmits the response ⑱, thereby completing the telewriting. Thereafter, D-channel DCH disconnects and releases the line between the A terminal and the exchange apparatus and the exchange and the B terminal.

Figure 11:
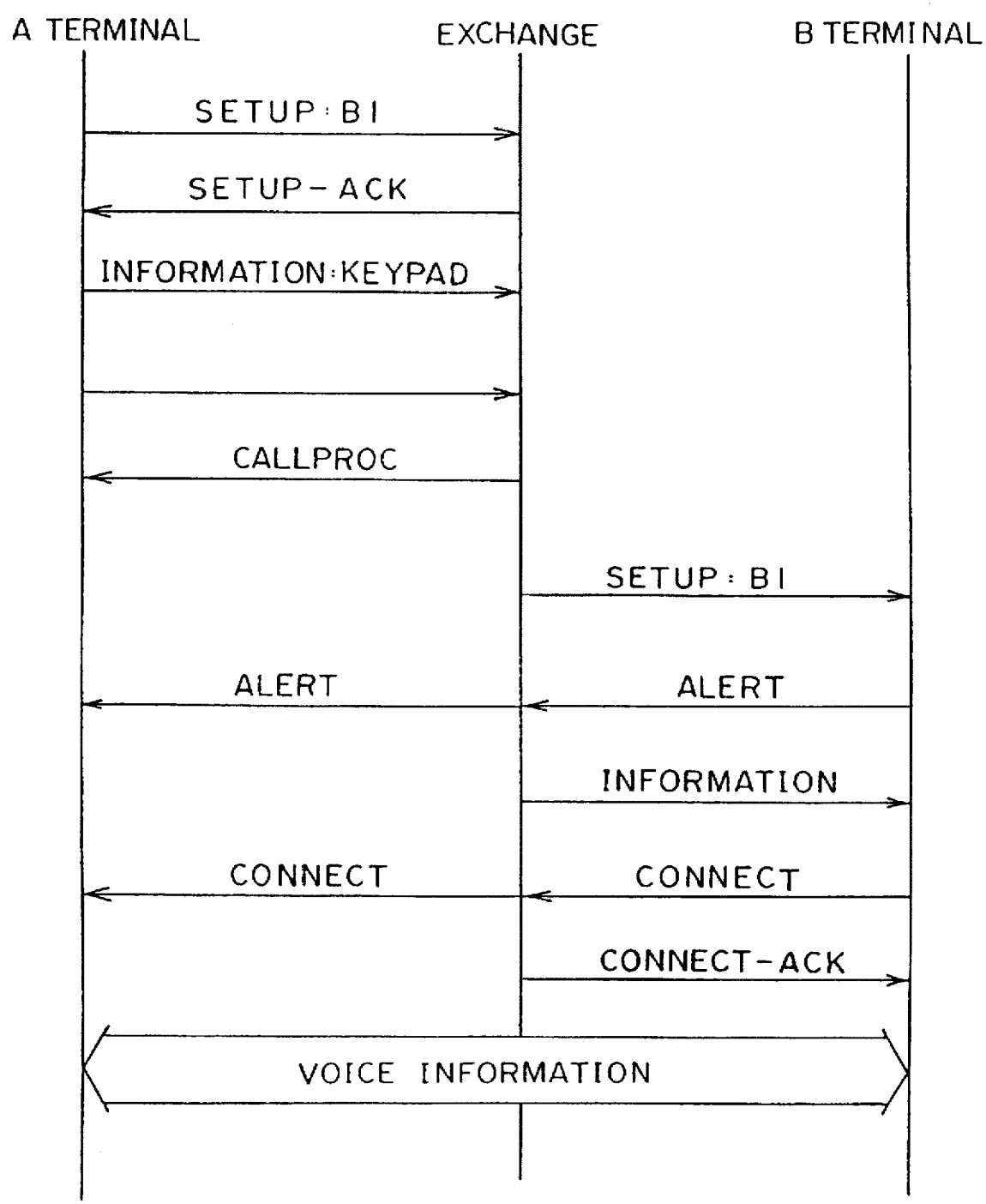
FIG. 11 shows a sequence of steps for producing a voice call.
Figure 12:
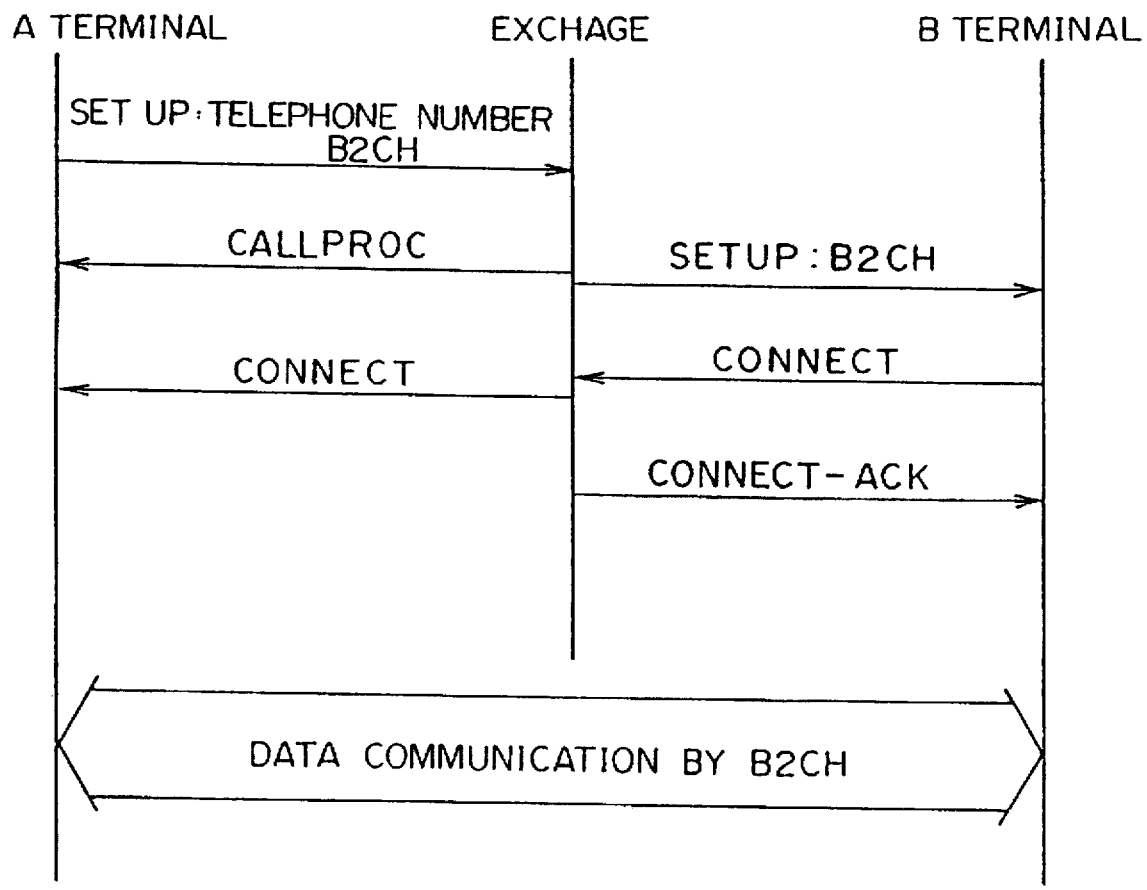
FIG. 12 shows a sequence of steps for producing a data call.
Figure 13:
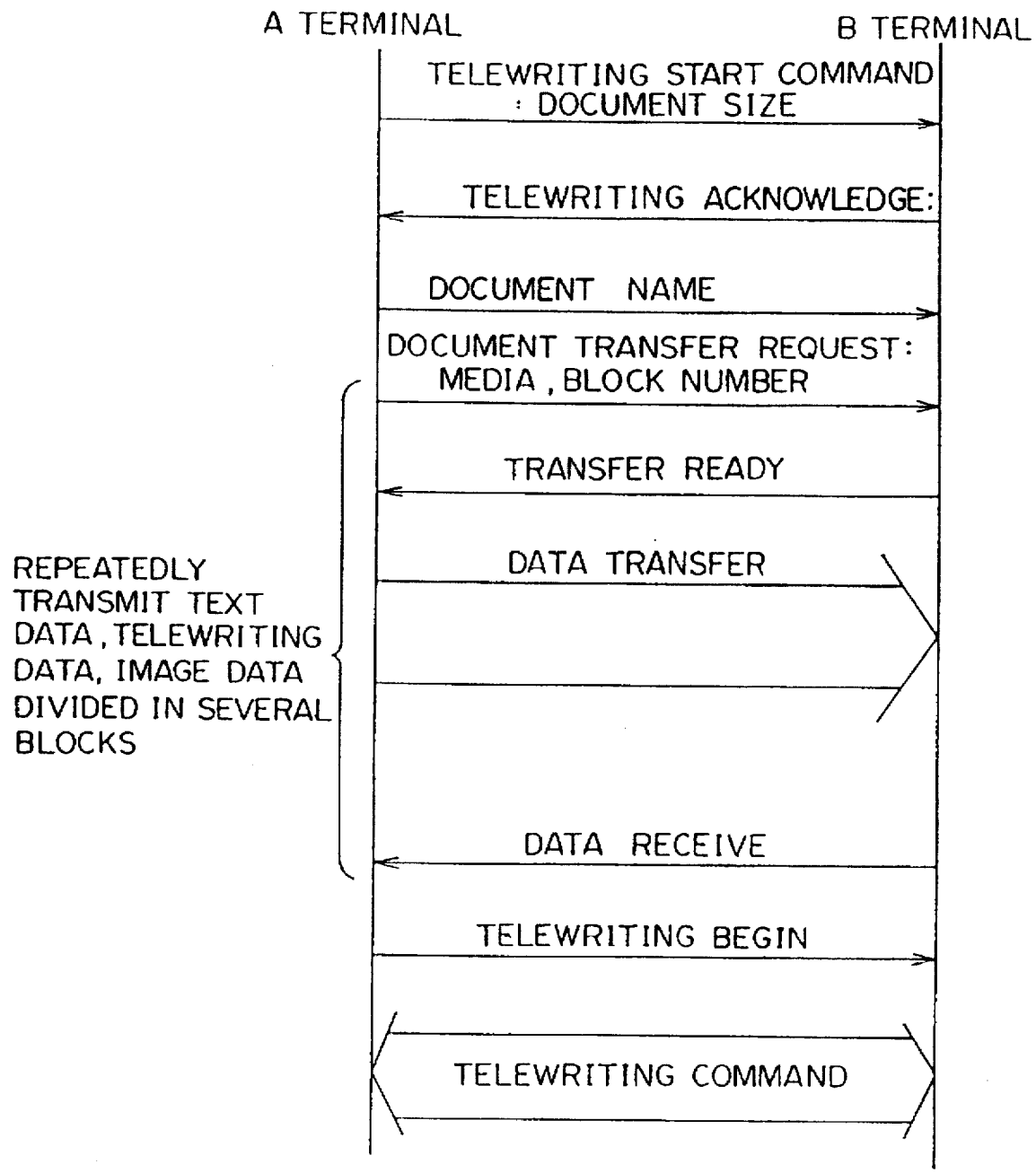
FIG. 13 shows a sequence of steps for executing a document transfer.

Users at the A terminal and B terminal get into a communication state in accordance with the sequences shown in 1 to 3 in FIG. 10. The embodiment of the calling sequence at this time is shown in FIG. 11. Thereafter, the user of the A terminal transmits the document prepared by him to the user of the B terminal at 7 in FIG. 10 after he presses a start icon for a telewriting. At this time, the connection sequence of the B2 channel is shown in FIG. 12 and the sequence for transmitting the document is shown in FIG. 13. A frame format for obtaining the data in B2 channel is shown in FIG. 14.

In FIG. 13, it is supposed that the document is transmitted from the A terminal. After the B terminal acknowledges receipt of a telewriting, the A terminal outputs a transfer of the document name and the request to transmit the document. In response to this, the B terminal informs the A terminal of a completion of a transfer of text. Hand-drawing data, text, and image data are divided into a number of blocks and transmitted continuously. After the A terminal receives a signal acknowledging receipt of data from the B terminal, actual telewriting starts.

Figure 14:
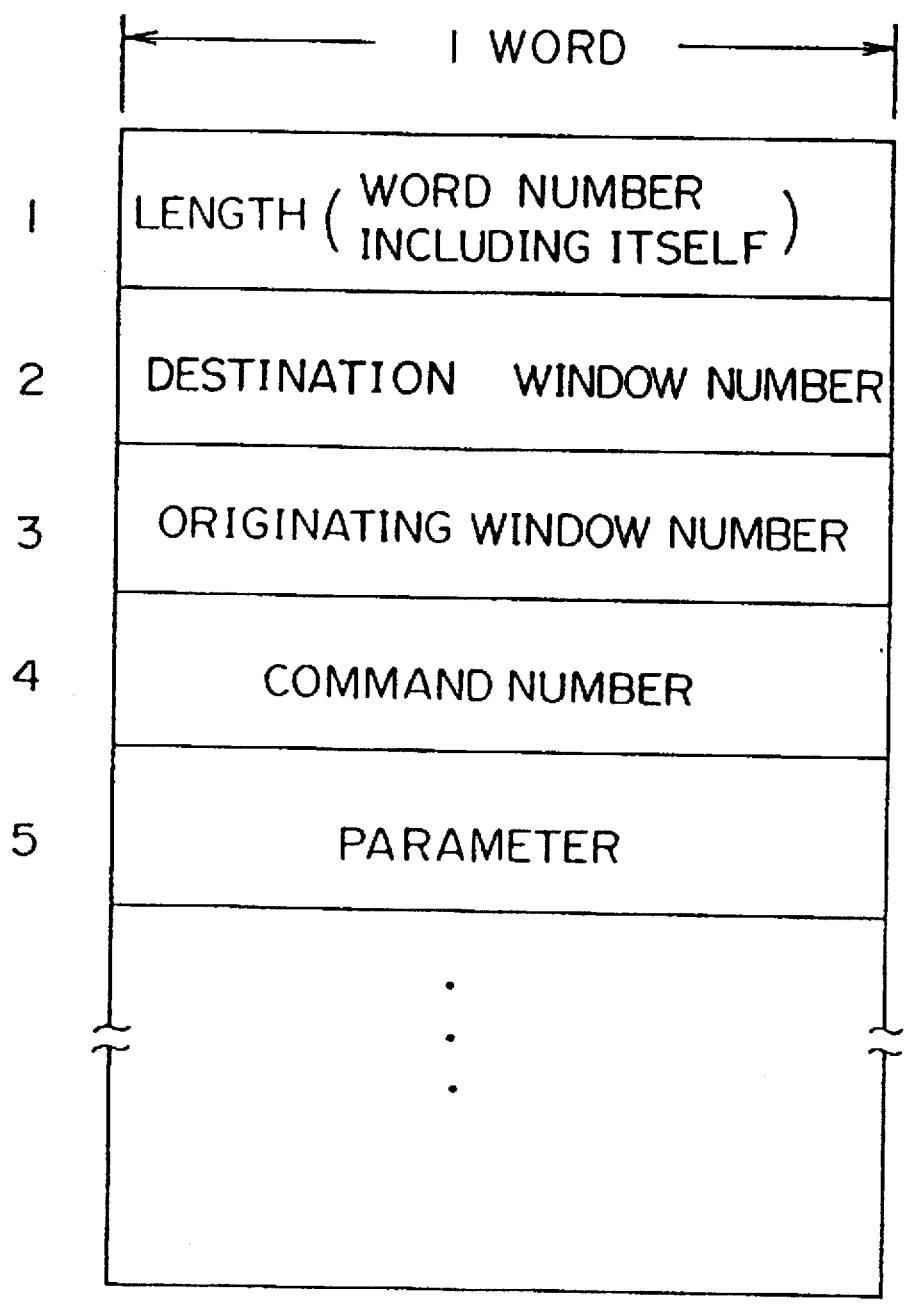
FIG. 14 shows the format of telewriting service command.

In FIG. 14, it is supposed that the window number of the terminal and the window number of the other terminal are given a transmission format by a window management data retained in a window management means 14. When a telewriting request command is transmitted, "0" is inserted to the transfer format as the window number of the other party is not yet identified. When a telewriting acknowledge command is received from the other party his window number is identified. This is retained as window management data in the window management means 14, and is used for the following window communication.

Where a telewriting terminal as shown in FIG. 5 can display a window whose size or frame can be changed optionally, it is generally called a multi-window. In this case a window screen scrolling method is considered for communication between terminals. The scrolling method is shown in the block diagram in FIG. 15. A sequence of a scroll control is shown in FIG. 16. A collision of a scroll confirmation request is shown in FIG. 17.

Figure 15:
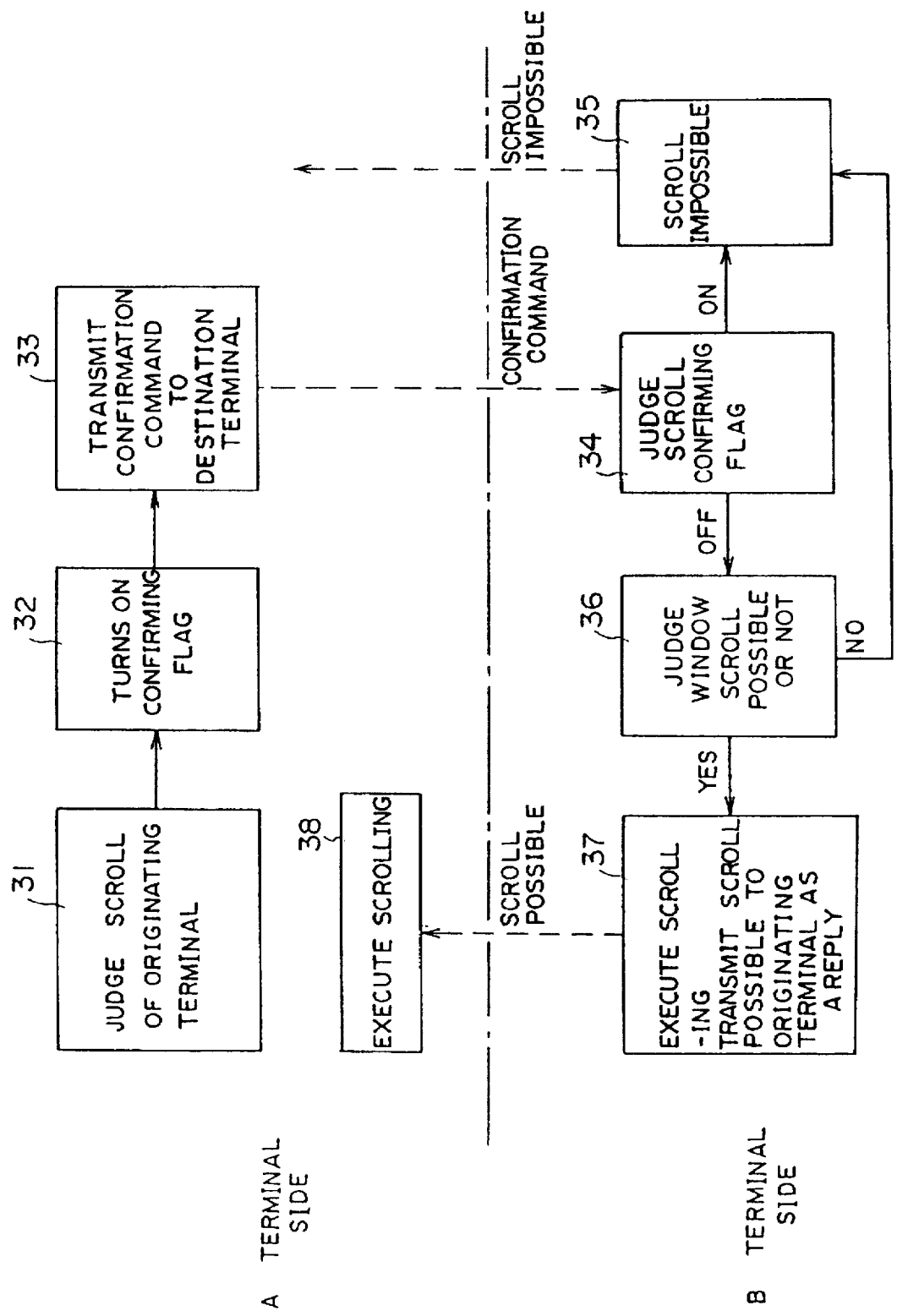
FIG. 15 is a view for explaining a method of scrolling a window screen.
Figure 16A:
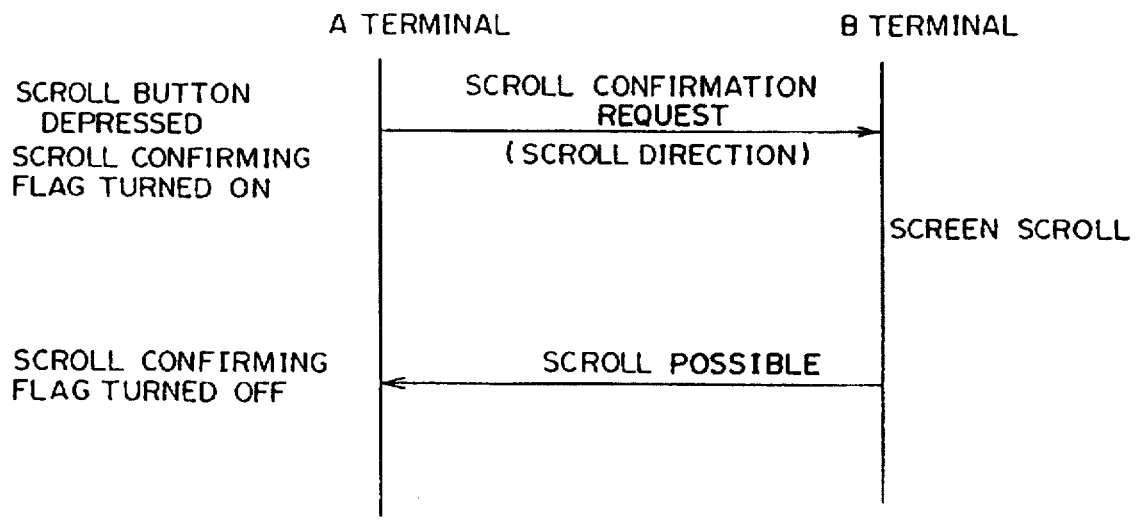
FIGS. 16A and 16B show a sequence of steps for designating a scrolling control.

In FIG. 15, it is supposed that the request for the screen scrolling is produced by the A terminal side as is similar to the above explanation. Block 31 on the A terminal side determines whether or not the terminal can perform a window scrolling. If the decision is YES, a flag showing that scrolling is confirmed is turned on at 32 and the scrolling confirmation request is transmitted to the B terminal side at 33. On the B terminal side, a flag showing that scrolling of the terminal is confirmed is turned off at 34 and it is judged at 36 whether or not window scrolling can be conducted. Thereafter, scrolling is carried out at 37 and a reply stating that scrolling can be conducted is transmitted to the A terminal. The A terminal receives this reply and turns off the flag showing that scrolling is being confirmed, and executes scrolling at 38. This corresponds to the sequence of FIG. 16A.

When a scrolling confirmation flag is turned on at 34 on the B terminal side, as shown in FIG. 15, the scrolling confirmation request is produced by the B terminal and a scrolling impossible reply is sent to the A terminal at 35. When scrolling is impossible, as shown at block 36, a scrolling impossible reply is similarly sent to the A terminal.

Figure 16B:
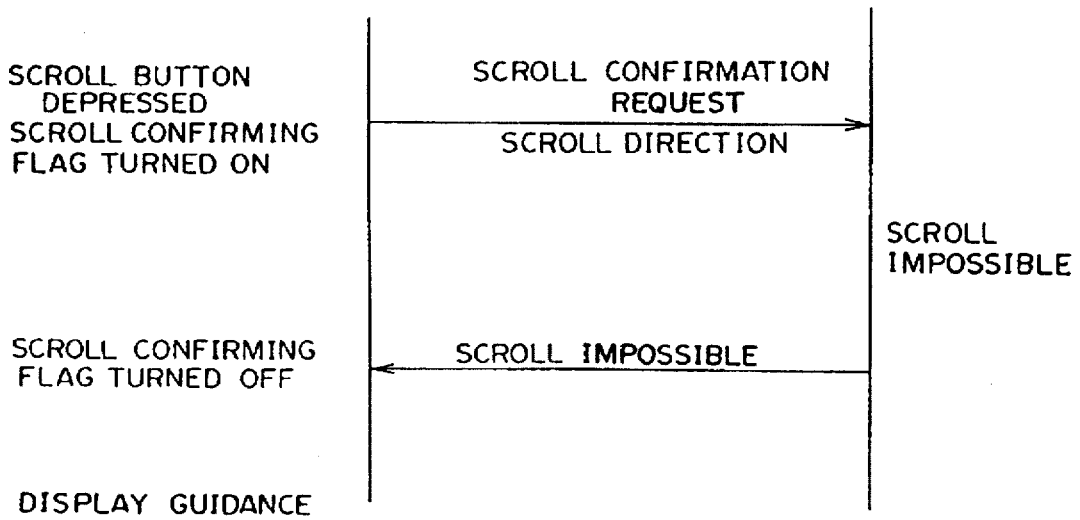
Figure 17:
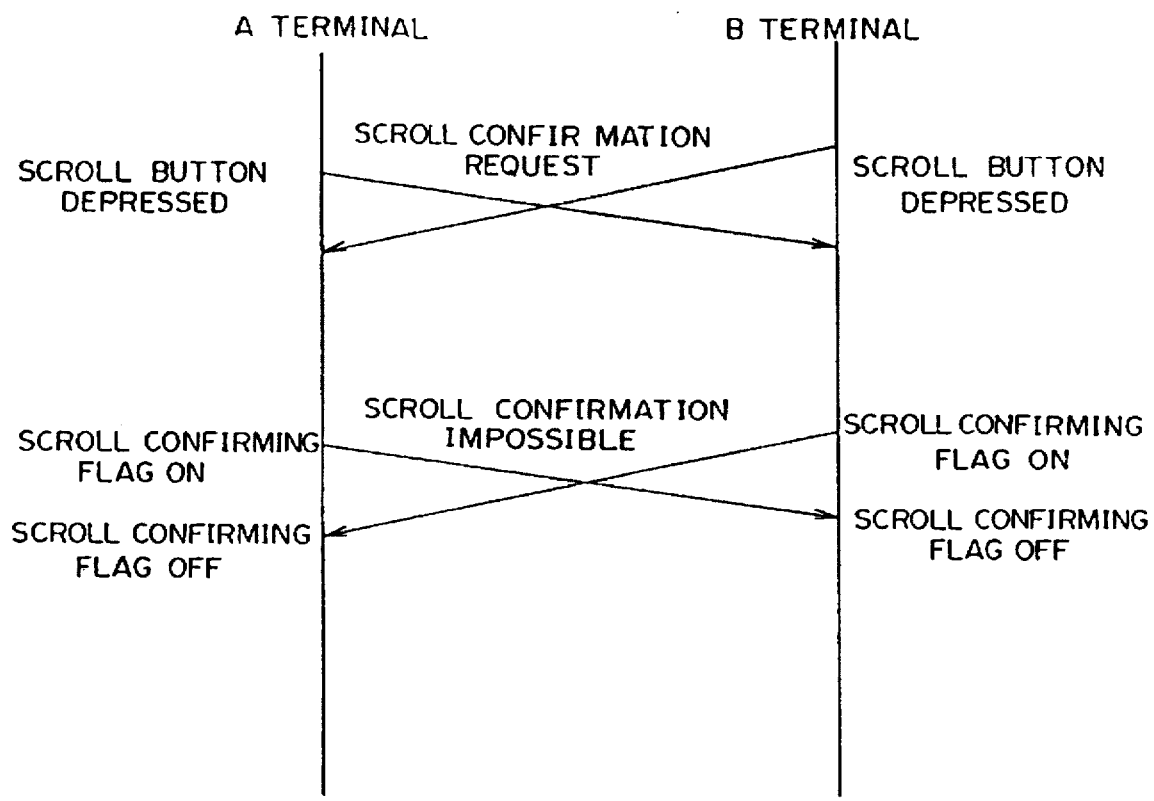
FIG. 17 shows a sequence of steps for designating a collision of scrolling confirmation requests.

FIG. 16B shows this sequence. The A terminal side turns off the scrolling confirming flag upon receipt of the scrolling impossible reply and performs a guidance display showing that scrolling is impossible.

FIG. 17 shows the sequence that results when the scrolling buttons at both A and B terminals are depressed simultaneously. Upon depression of the scrolling buttons, the scrolling confirmation flags of both terminals are turned on, and a scrolling-impossible reply is sent to both terminals in response to a request for confirmation. Therefore, the scrolling confirmation flags of both terminals are turned off.

Figure 18:
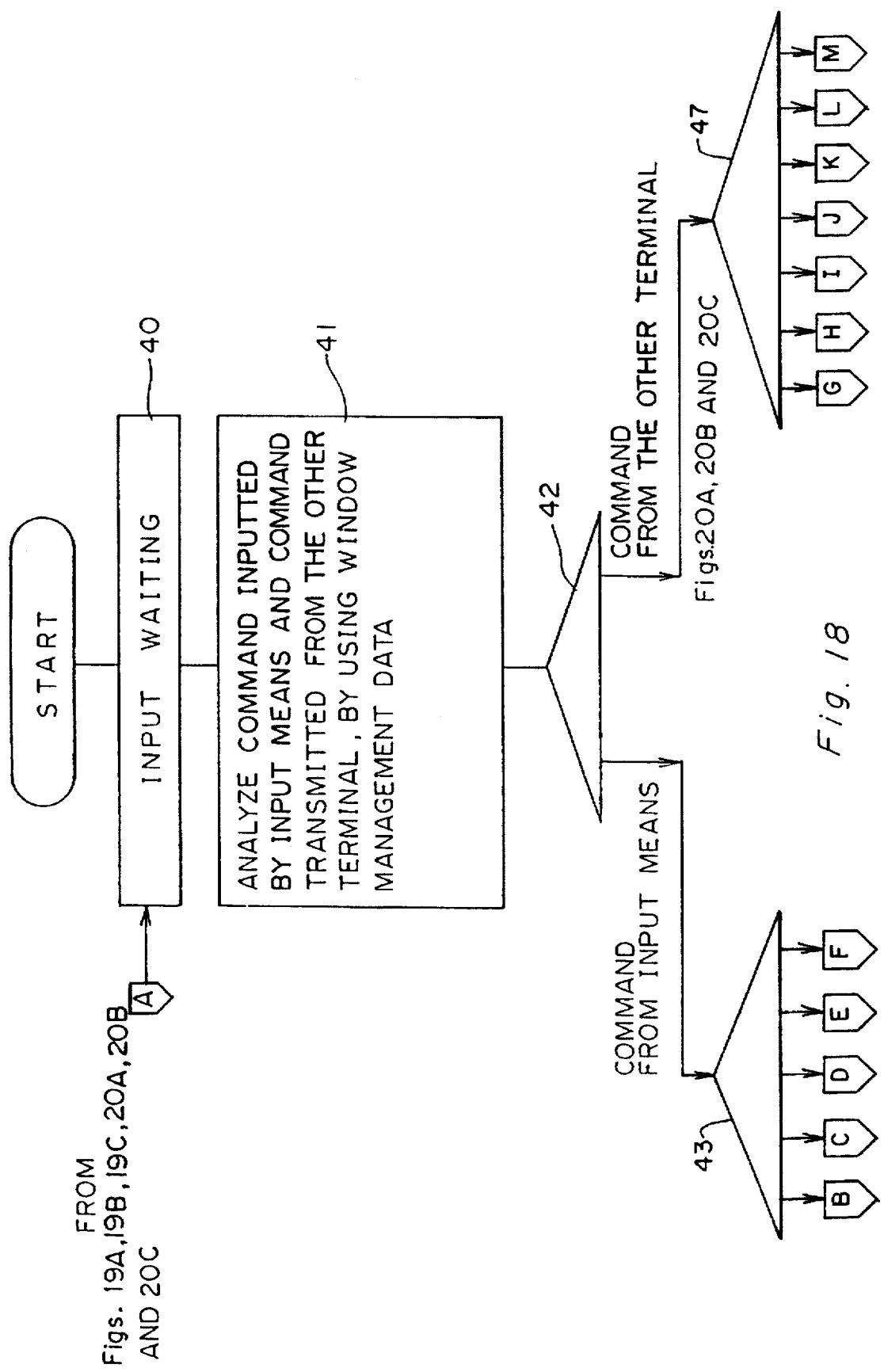
FIG. 18 shows an operational flow chart of a command analysis means and a window management means.

FIG. 18 shows an operational flow chart of command analyzing means 11. As stated above, command analyzing means 11 analyzes the content of the command input by an input means 10, such as an input pen 18, and the command received from the other terminal through transmitting and receiving means 13. When the input is entered at step 40, the command analysis is conducted at step 41 and the window management data shown in FIG. 8. At step 42, the command from the input means is distinguished from the command from the other terminal and both of them are sent to window management means 14.

Steps 43 and 47 in FIG. 18 and FIGS. 19A to 20C show an operational flow chart of window management means 14. Window management means 14 controls scrolling and manages the window status in response to a user command input from input means 10 and a command input from the other terminal through transmitting and receiving means 13.

Step 43 in FIG. 18 and FIG. 19 form an operational flow chart for a pen input in which the input is entered on tablet 19 by input pen 18 as shown in FIG. 5. Step 47 in FIG. 18 and FIG. 20 form an operational flow chart for the command entered by the other terminal via a network.

For example, where a communication between windows starts between an A terminal and a B terminal, input pen 18 touches an icon on the terminal display, thereby enabling the pen input to be detected at step 40 shown in FIG. 18 and the input coordinate is analyzed by command analysis means 11 at step 41. When window management means 14 judges that the telewriting start command is received, based on the output of command analysis means 11 at step 43 of FIG. 18, transmitting and receiving means 13 is requested to transmit a request for telewriting start command with a window number used for communication in the A terminal as a parameter, to the B terminal at step 44 in FIG. 19A. The content of the window management table is renewed in response to a reply from the B terminal side at step 45. Where a connection of the B channel B2CH is not yet conducted at step 44, a connection is requested to transmitting and receiving means 13. A window management table is provided inside data memory 26 in respective terminals. An example is shown in FIG. 24. A communication status designating whether it is local or in communication and the data of the display area on the display is stored in a plurality of windows in the home terminal. Thereafter, at step 46 transmitting and receiving means 13 is asked to transmit the document data used in the communication window of the A terminal to the B terminal as a batch. Telewriting start processing then ends and returns to await input at step 40 in FIG. 18.

The B terminal side receives, from command analysis means 11, a telewriting start request from the A terminal as a command from a network at step 42 shown in FIG. 18 and determines the kind of command at step 47. When a telewriting start request is judged, an unused window number is hunted at step 48 in FIG. 20A. A telewriting acknowledge is informed to the A terminal by using the window number used for communication between A and B terminals as a parameter at step 49. Data is received from the A terminal and stored in the memory at step 50. Display means 12 is asked to perform a display on a communication window on the B terminal at step 51. Telewriting start processing then ends and returns to step 40.

Telewriting starts when the A terminal user performs a pen touch display image on the window display in communication on tablet 19. The pen input is executed as an image telewriting command at step 43 through steps 40 to 42. The status of the window on which image telewriting data is input is referred to at step 52 in FIG. 19B. If the window receiving a pen input is determined as local at step 53, drawing is conducted only at the originating terminal at step 54. Processing then returns to step 40.

By referring to the window management table at step 52, the window to which hand-drawing data is input may be determined as in communication at step 53. Drawing is conducted at the originating terminal at step 55 and hand-drawing data is transmitted to the other terminal (B-terminal).

Hand-drawing data from the A terminal is received by the B terminal as a command from a network. After the processes at steps 41 and 42, the command is judged as a drawing order, at step 47 and then in step 56 (FIG. 20B) the window number to be drawn is referred to in the window management table at the originating terminal. The window memory address (or memory address) in which the document of the corresponding window is stored is used as a parameter and the drawing order is transmitted to the display means and the process is returned to step 40.

Upon completing a telewriting or upon interrupting a communication directed to a predetermined window between window communication terminals, a request is entered as a command by a pen input from the A terminal and judged as a telewriting end command at step 43 through steps of 40 and 42. The telewriting end request to the B-terminal is output to be transmitted with the window numbers of both terminals as a parameter, at step 57 in FIG. 19A. The content of the window management table is renewed from a communication state to a local state at step 58, thereby being returned to step 40. At the B terminal the telewriting end request is received as a command from the network. After steps 41 and 42, the telewriting end request is judged at step 47. The status of the corresponding window in the window management table is made local at step 59 in FIG. 20A. The process then returns to step 40. When all the in-communication windows are deleted at step 59, the disconnecting of B2CH is conducted.

Further, where the window which is used locally or for communication in the own terminal is deleted, the user touches an icon on the display. After steps 40 to 42, if a window deleting command is received in step 43, the window management table is rewritten at step 60 in FIG. 19B and a request for window deletion is conducted by display means 12 at step 61, then the process returns to step 40. When it is necessary to create a new window, a pen touch on a icon on the user's display is judged as a window create command at step 43 after steps 40 to 42. An unused window number is searched at step 62 in FIG. 19B and the new window display is requested at step 63, then the process returns to step 40.

Next, the scrolling control sequence is explained by referring to the flow charts shown in FIGS. 18 to 20. If the user at the A terminal 1 inputs a scrolling command (scroll button) on display 24 by using input pen 18, for example, it is judged as a scroll command at step 43 after steps 40 to 42.

Figure 19A:
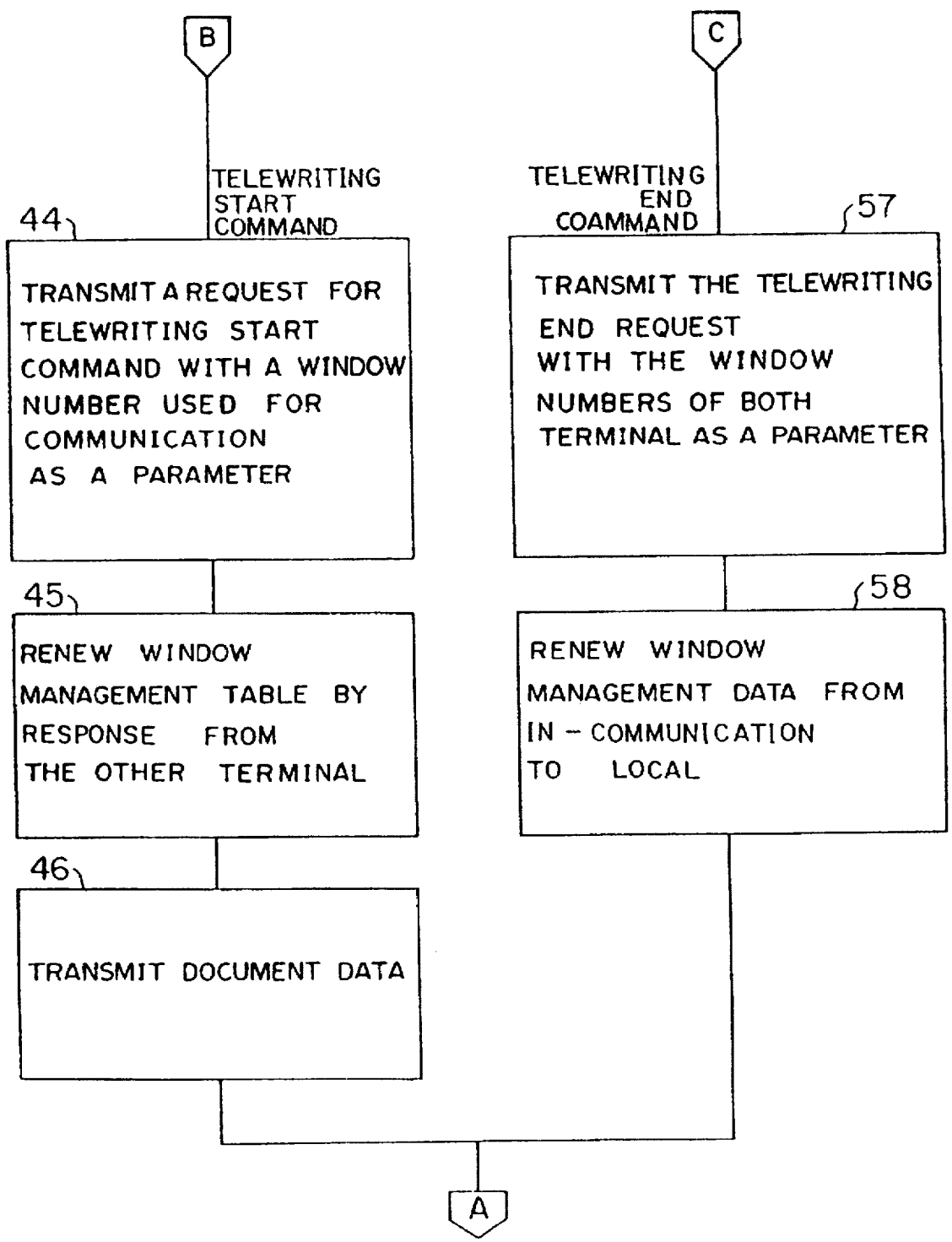
FIGS. 19A to 19C show operational flow charts of the window management means.
Figure 19B:
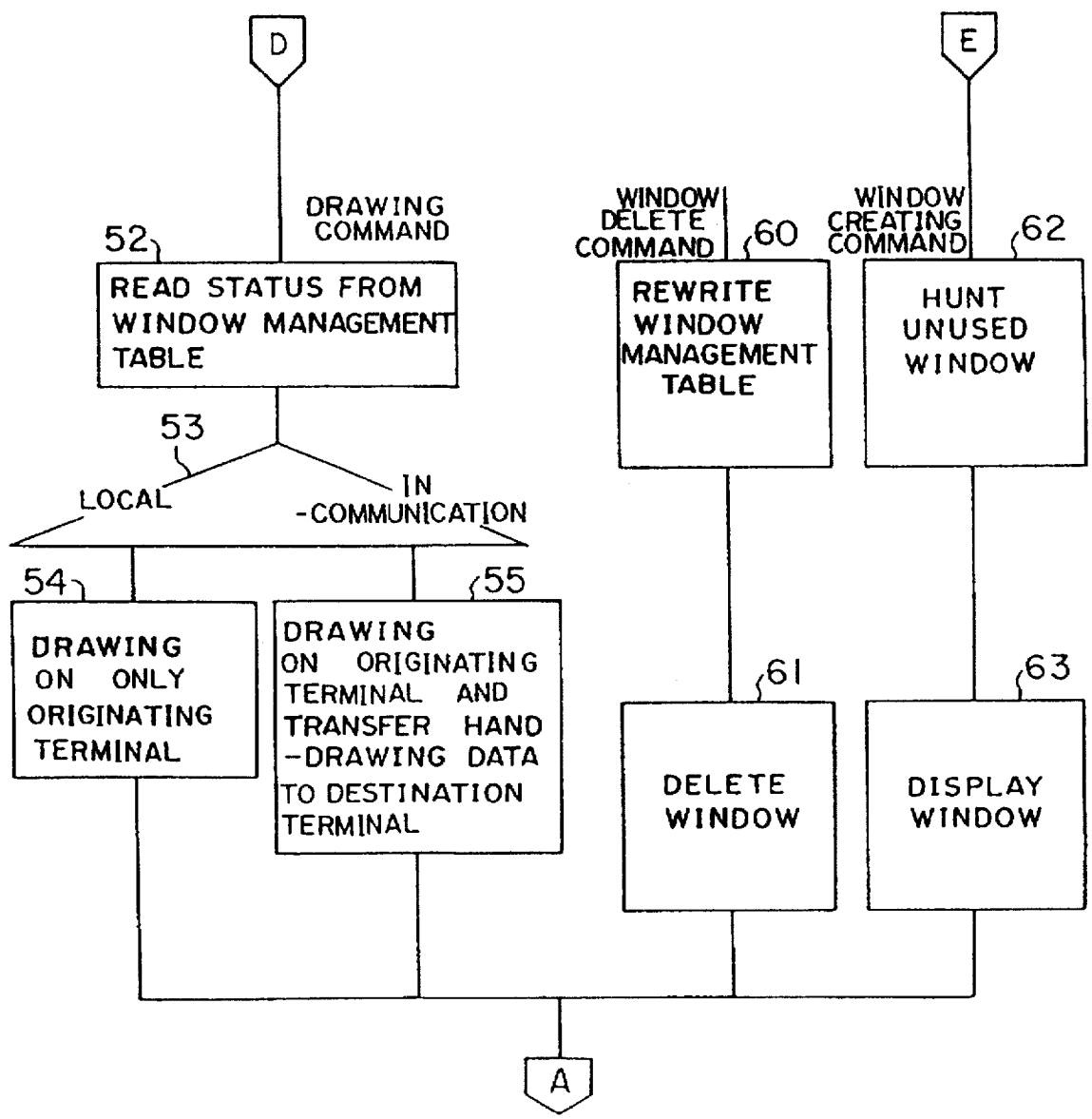
Figure 19C:
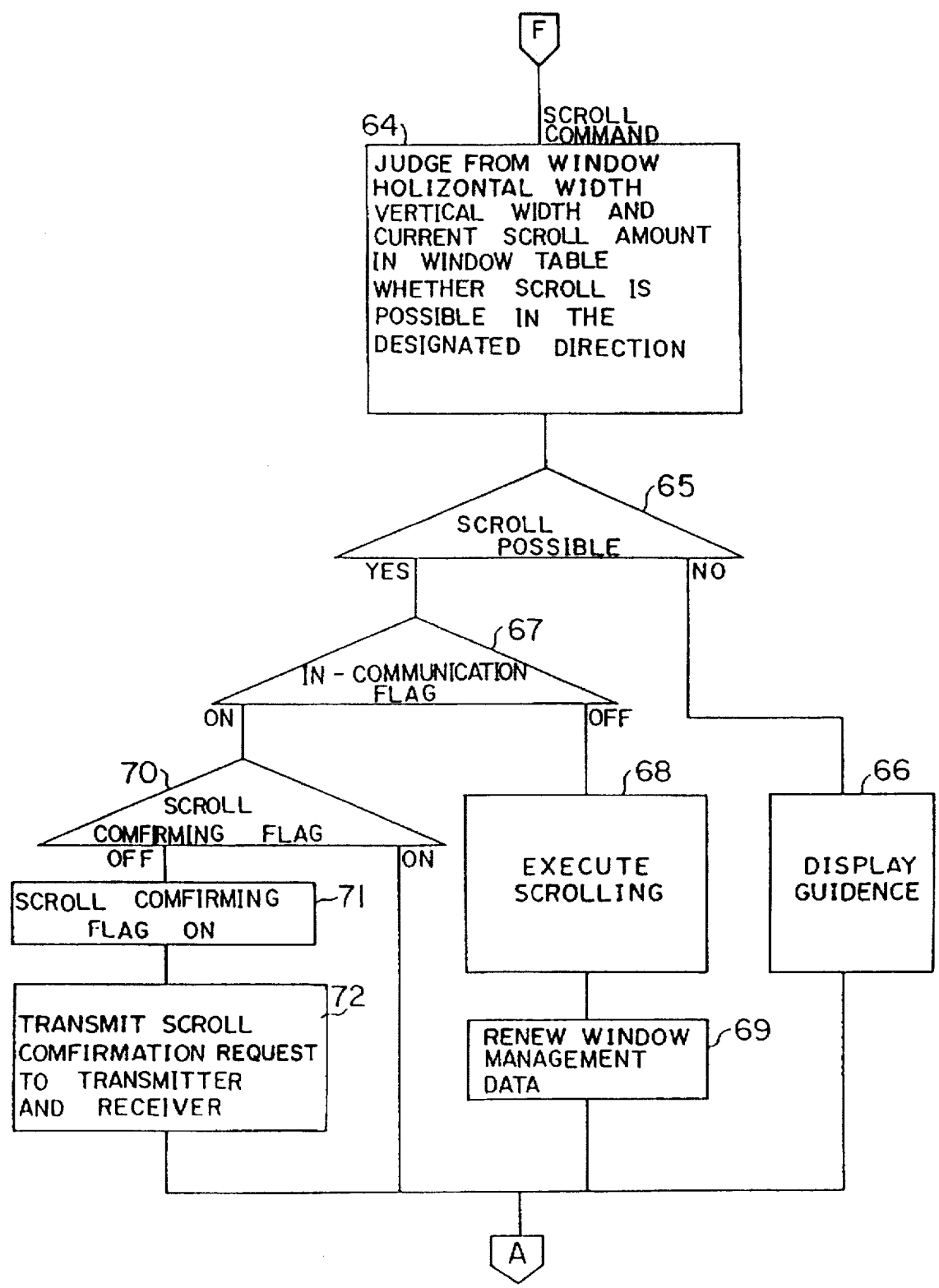

Therefore, at step 64 in FIG. 19C it is judged from the longitudinal width, horizontal width and scrolling amount based on window in the window management data whether the A terminal 1 can scroll the window of the originating terminal in the desired direction. If it is judged at step 65 that scrolling is impossible, a guidance display is made on the display means 12 at step 66, and the process returns to step 40.

When it is judged that scrolling is possible, it is judged from a flag designating a status of in-communication at step 67 whether the scrolling command from the user is given to the window in communication. If the flag is off, the window to be scrolled is not in communication and the screen scrolling requested by display means 12 at step 68 causes the window management data to be renewed at step 69, and the process is returned to step 40.

When a flag designating "in-communication" is turned on, the content of a flag showing a scroll confirming operation is judged at step 70. If this flag is already turned on, the response to a scroll confirmation request which was previously produced by the B terminal 2 has not yet been provided and the process is returned to step 40 without producing a new scroll confirmation request.

When the scroll confirming flag is off, it is turned on at step 71 and a scroll confirmation request is transferred to the transmitting and receiving means 13 at step 72, and the scroll confirmation request is transmitted to the B terminal 2 as shown in FIGS. 16A and B. When B terminal 2 receives this confirmation request it transmits it to window management means 14 as an input from transmitting and receiving means 13 at step 42 through step 41 and the scrolling confirmation command is judged at step 47 in FIG. 18. Next, the content of the scrolling confirmation flag at the B terminal 2 is judged at step 73 in FIG. 20B and if the scroll confirming flag is off, it is judged in step 74 whether scrolling in the predetermined direction is possible. When scrolling can be conducted, it is requested at step 75 by display means 12 and the window management table is renewed at step 76. A reply designating that scrolling is possible is transmitted to transmitting and receiving means 13 at step 77, and the process returns to step 40.

Figure 20A:
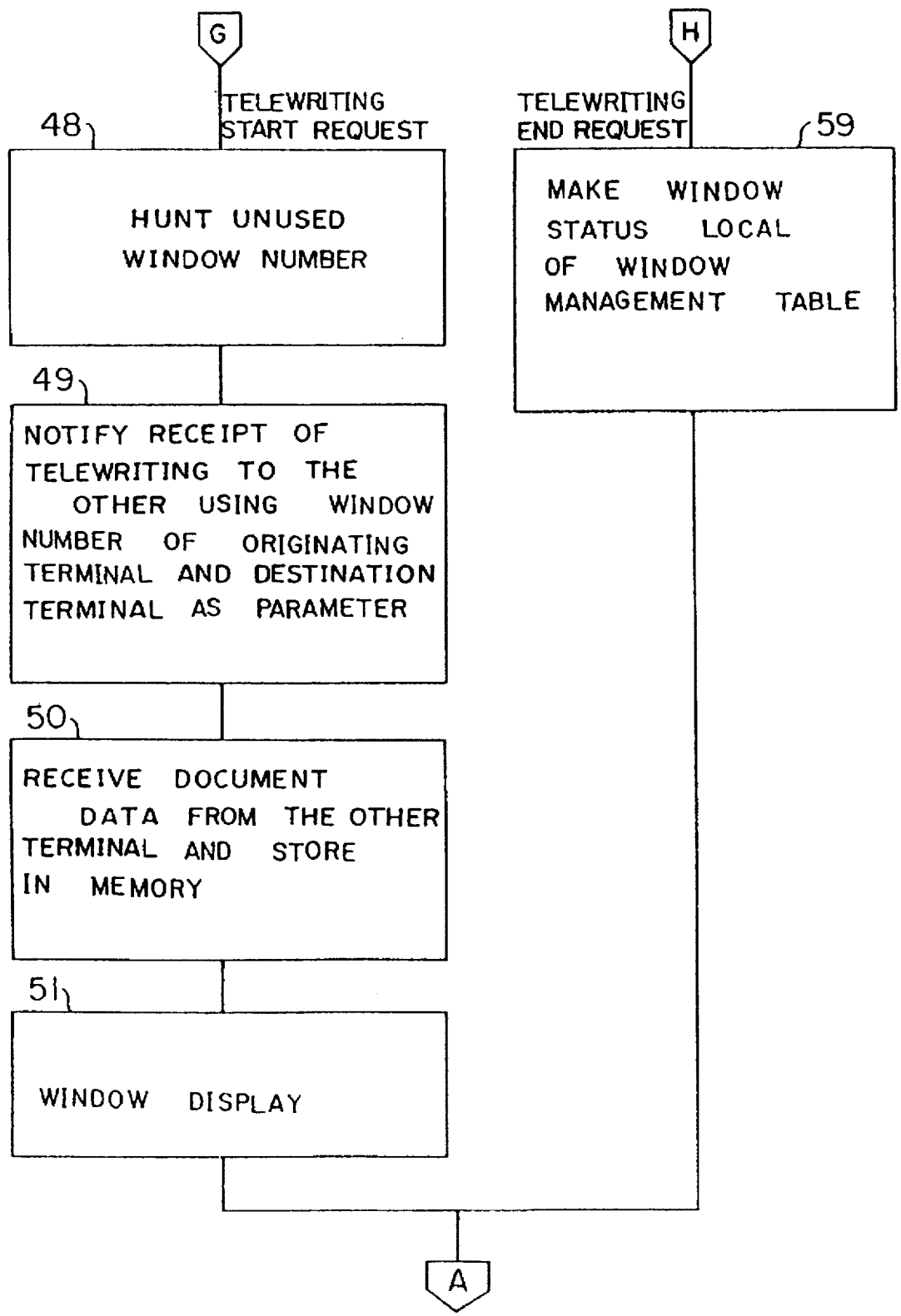
FIGS. 20A to 20C show operational flow charts of the window management means.
Figure 20B:
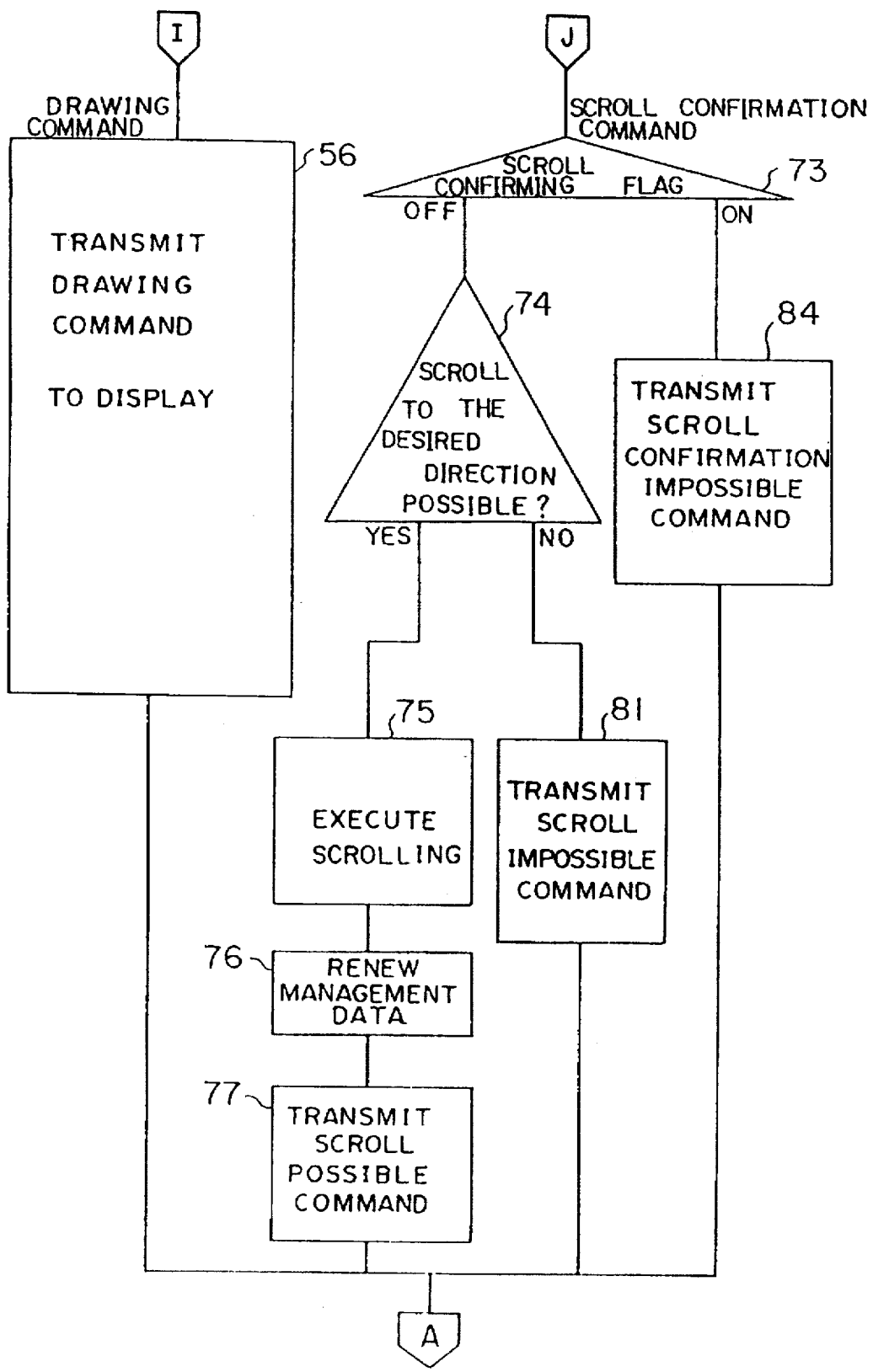
Figure 20C:
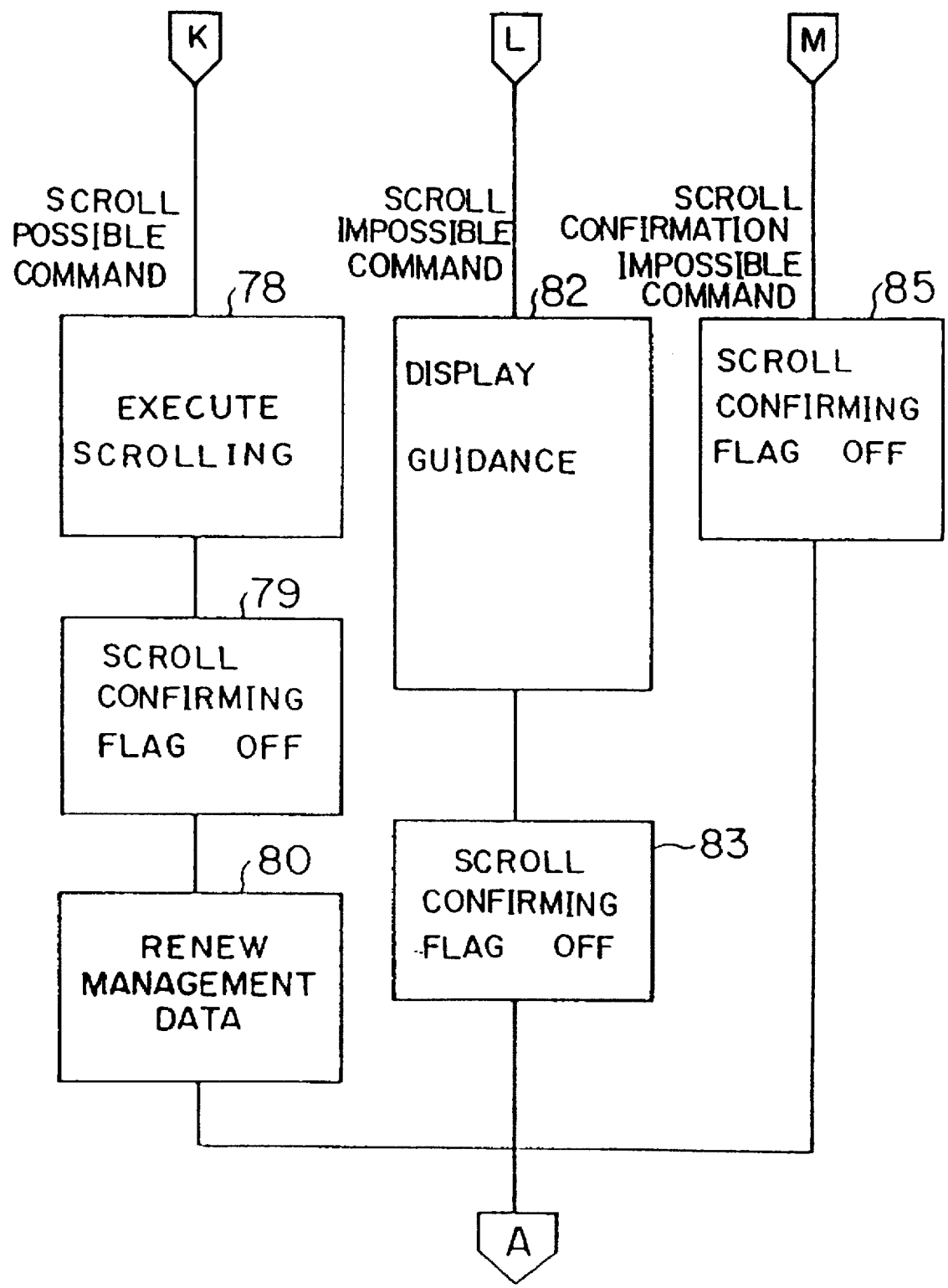

After steps 41, 42, the A terminal 1 judges that the reply from the B terminal 2 at step 47 is a scroll possible command and asks display means 12 to perform a screen scrolling at step 78 in FIG. 20C and turns the scroll confirming flag off at step 79. After the window management data is renewed at step 80, the process is returned to step 40. Thus, the sequence of FIG. 16A is completed.

When it is judged at step 74 (FIG. 20B) at B terminal 2 that scrolling in a predetermined direction is impossible, a scroll impossible reply is transmitted to transmitting and receiving means 13 at step 81. The reply is judged as a scroll impossible command at step 47 (FIG. 18) of the A terminal 1. The guidance display showing the above operation is requested by display means 12 at step 82 in FIG. 20C. At step 83 the scroll confirming flag is turned off, and the process is returned to step 40. This corresponds to the sequence of FIG. 16B.

When the scroll confirming flag is judged to be on at step 73 at B terminal 2, it means that the reply to the scroll confirmation request previously transmitted from the B terminal 2 to A terminal 1 is not made. In order to prevent a collision of scroll confirmation requests as illustrated in FIG. 17, a scroll confirmation impossible reply is transmitted to transmitting and receiving signal means 13 at step 84 in FIG. 20B. This reply is judged as a scroll confirmation impossible command at the A terminal 1 side at step 47 (FIG. 18) and the scroll confirming flag is turned off at step 85 in FIG. 20C. The process is then returned to step 40.

Figure 21:
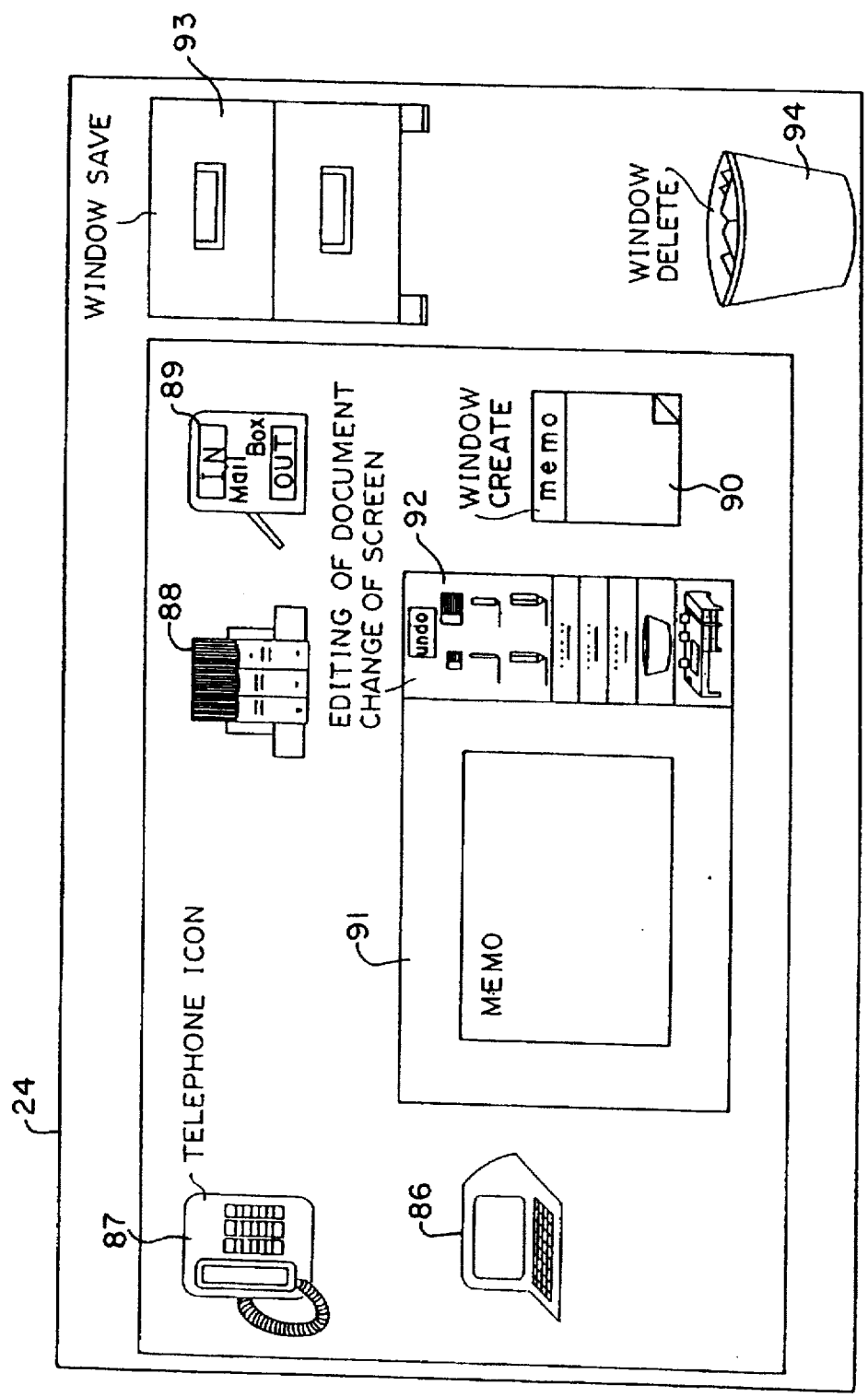
FIG. 21 shows the initial screen configuration of the terminal.

Next, by referring to the multi-window telewriting terminal shown in FIG. 5, the case where the user (user A) of the A terminal 1 telephones a user (user B) of the B terminal 2 and telewriting is conducted is explained in detail. FIG. 21 shows an initial screen of the terminal. Terminal icon 86, telephone icon 87, book shelf icon 88, mail box icon 89, memorandum paper icon 90, under sheet icon 91, pencil case icon 92, file master icon 93 and waste basket icon 94 are respectively shown. The meaning of the icons will be briefly explained. When the terminal icon 86 is touched by a pen, the terminals start to function, as the data terminal can receive an input from keyboard 16. When the telephone icon 87 is touched by a pen a multi-functional telephone board comprising a telephone dial key, transfer button, and suspending button is displayed. The displayed buttons are designated by input pen 18 thereby enabling an input such as a telephone number to be entered, thereby providing a telephone function in which a communication is possible using hand-set 27. When the shelf icon 88 is pen-touched, the process shifts to a phase in which access is made to a data base such as a telephone book or a schedule note. If the mail box icon 89 is pen-touched after the document is pen-touched, the process shifts to the phase in which a document is transferred by electronic mail and if the mail box 89 is pen-touched before the document is pen-touched, a list of received mail is displayed and the process moves to a phase in which mail is read out.

When memorandum paper icon 90 is pen-touched, it means that the blank document is determined or picked up. If the underlay icon 91 is pen-touched after the document is pen-touched, the document is displayed. When the pencil case icon 92 is pen-touched, the process progresses to a screen on which the document is edited. If file master icon 90 is pen-touched, the drawer is opened and the document in the drawer is displayed. If, after the document is pen-touched, the waste basket case icon 94 is pen-touched, the document is deleted.

In FIG. 21, user A obtains the document (MEMO) from the master file and places it on the underlying diagram. User A utilizes a multi-functional telephone displayed on a screen by pen-touching the diagram of the telephone thereby telephoning user B. The call-execution sequence is shown in FIG. 11.

Figure 22A:
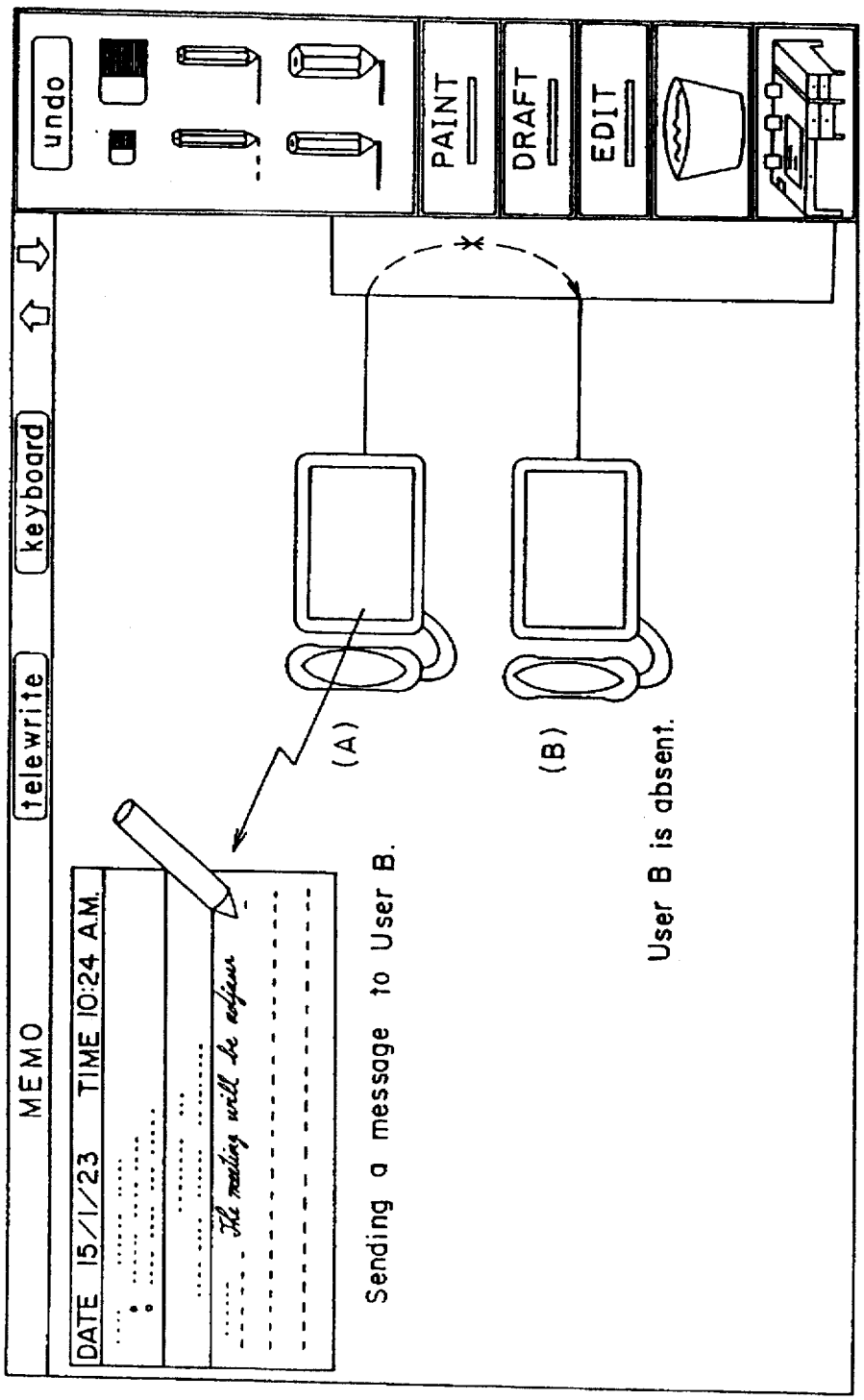
FIGS. 22A and 22B show a screen of a transmitting terminal.

When the user B answers the telephone, user A pen-touches the diagram of the pencil case to transfer the document by proceeding to the screen illustrated in FIG. 22A.

Figure 22B:
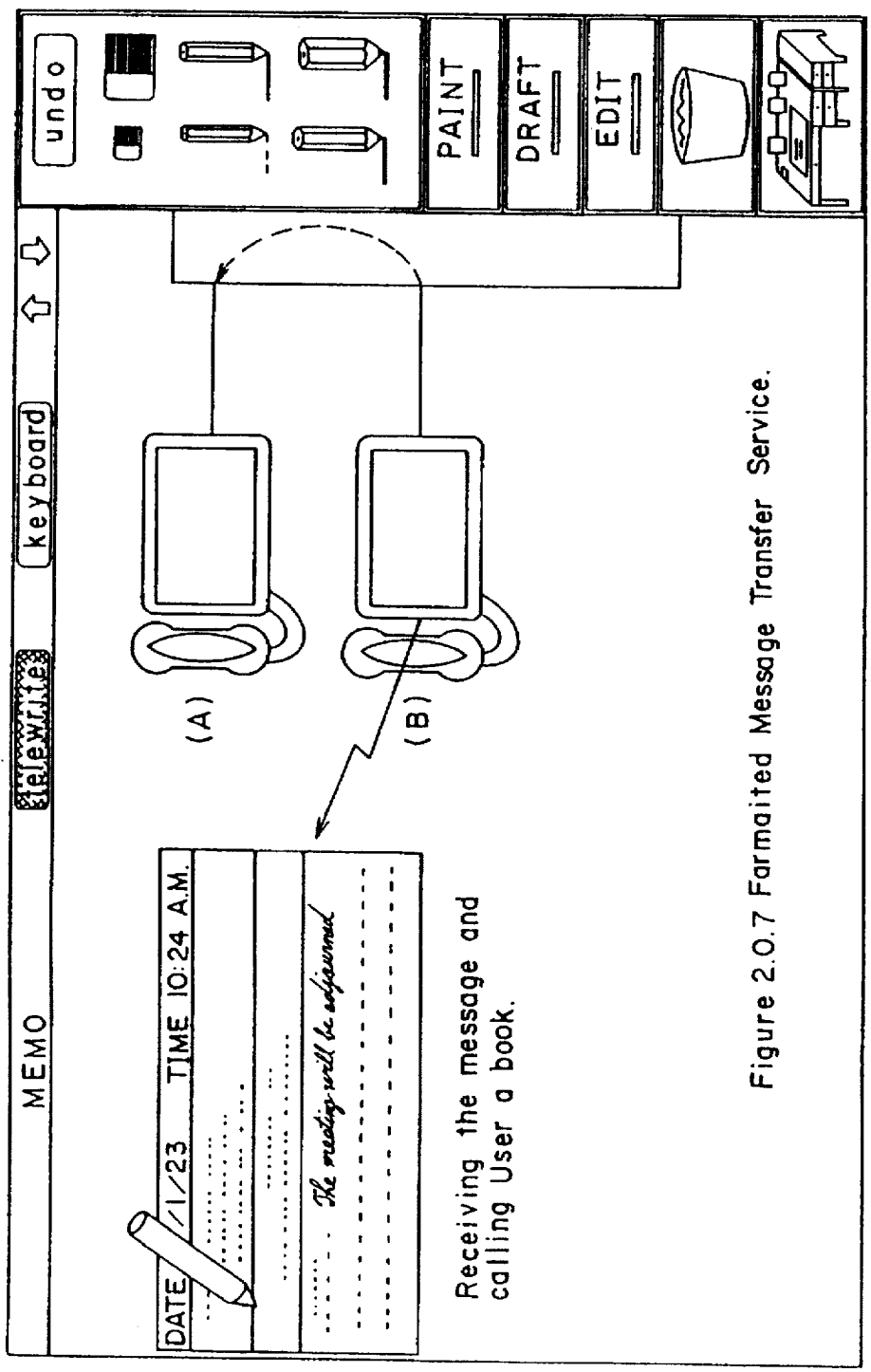

FIG. 22B shows a status of a screen at the lowest end after a user A scrolls the screen downward at an originating terminal shown in FIG. 22A. Therefore, a picture on the screen in FIG. 22B differs from the one on the screen in FIG. 22A. Various drawing tool icons such as a pencil and an eraser as shown on the right side of the screen, are selected by the input-pen 18. The telewriting mode varies in accordance with respective icons. As shown in the drawing, the name MEMO of the document is provided on the upper left side on the document and an icon for designating the document is provided. The meaning of the icons are explained sequentially from the left side. They are the telewriting start button, keyboard input button, upper scroll button on the screen and lower scroll button on the screen.

Figure 23A:
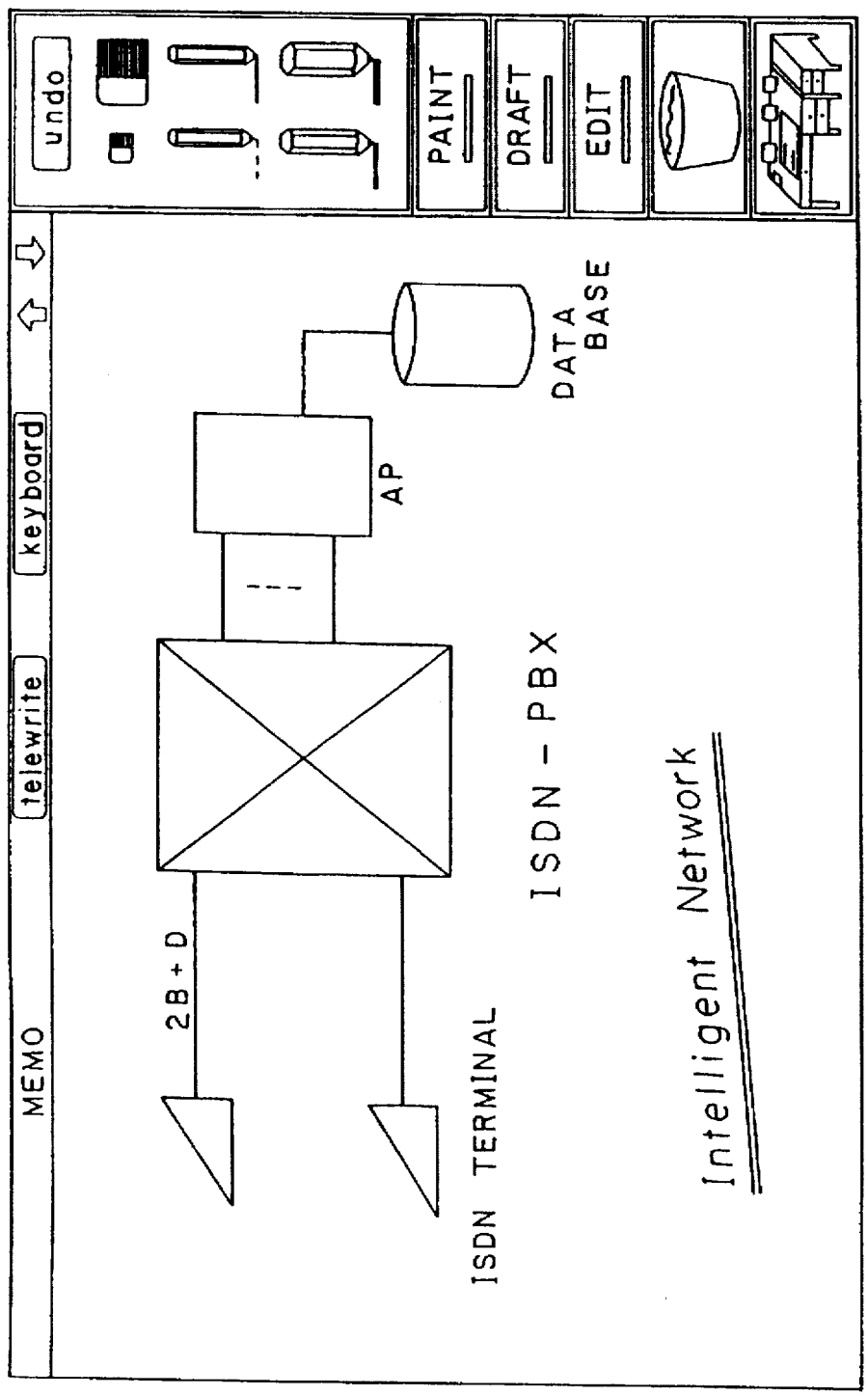
FIGS. 23A to 23D show screens of a receiving terminal.
Figure 23B:
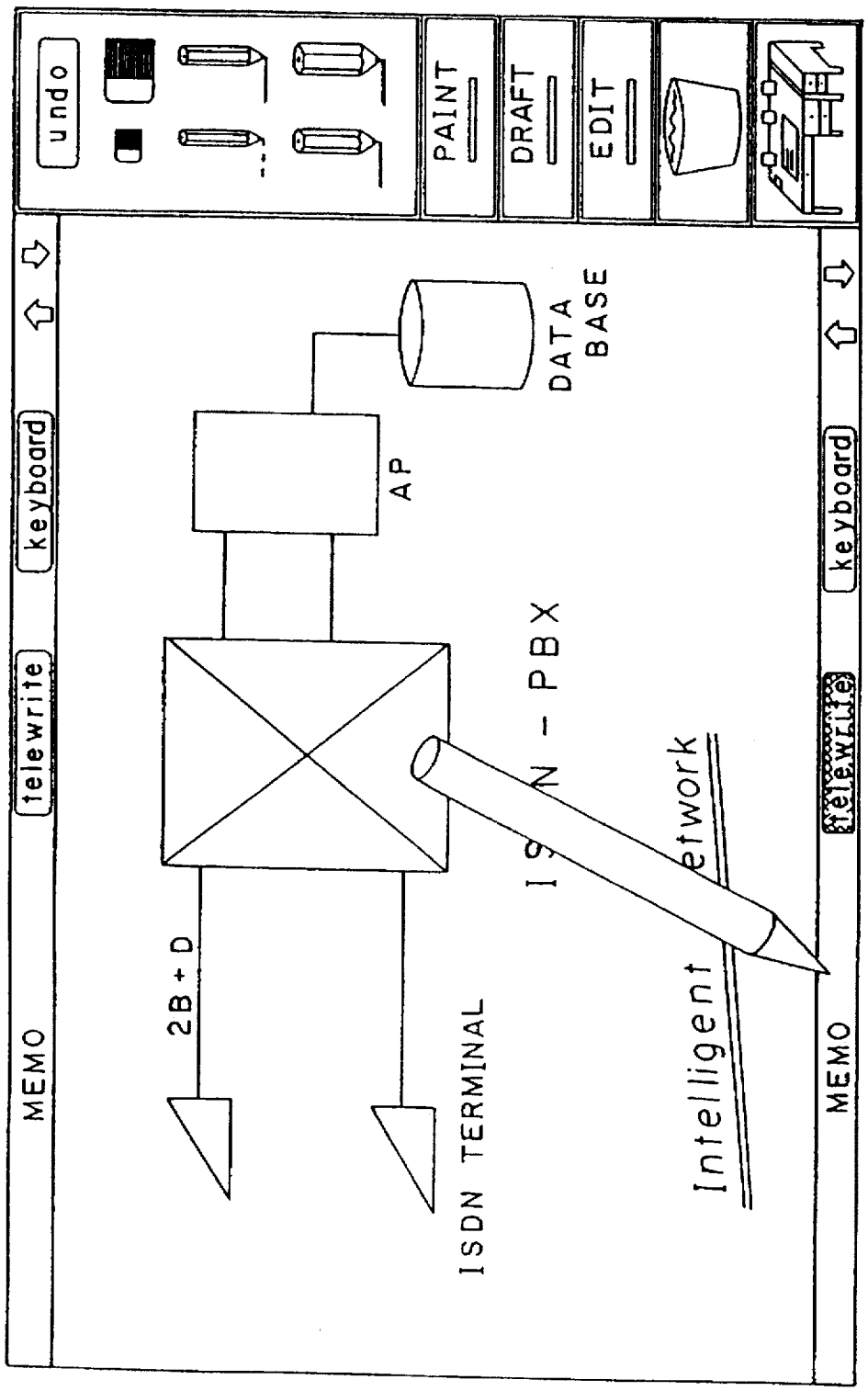

The screen of user B shows that a document is being prepared in the local mode as shown in FIG. 23A, in the state before a telewrite document is received. When the transfer of the document from user A is completed, a title bar of the received document is expressed at the lower part of the screen. The received document is then in a telewriting status and the telewriting button is displayed such that white and black are reversed.

Figure 23C:
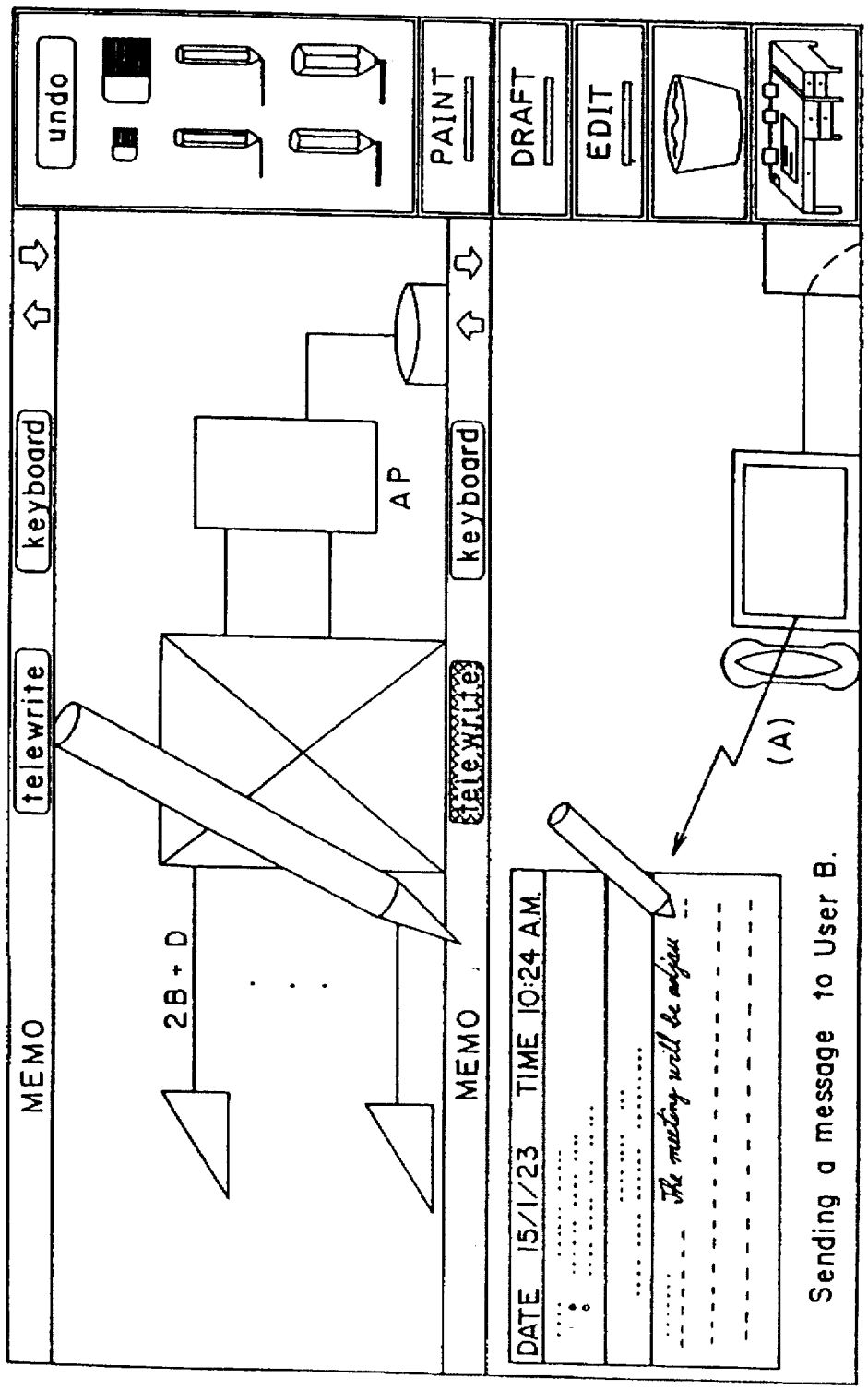
Figure 23D:
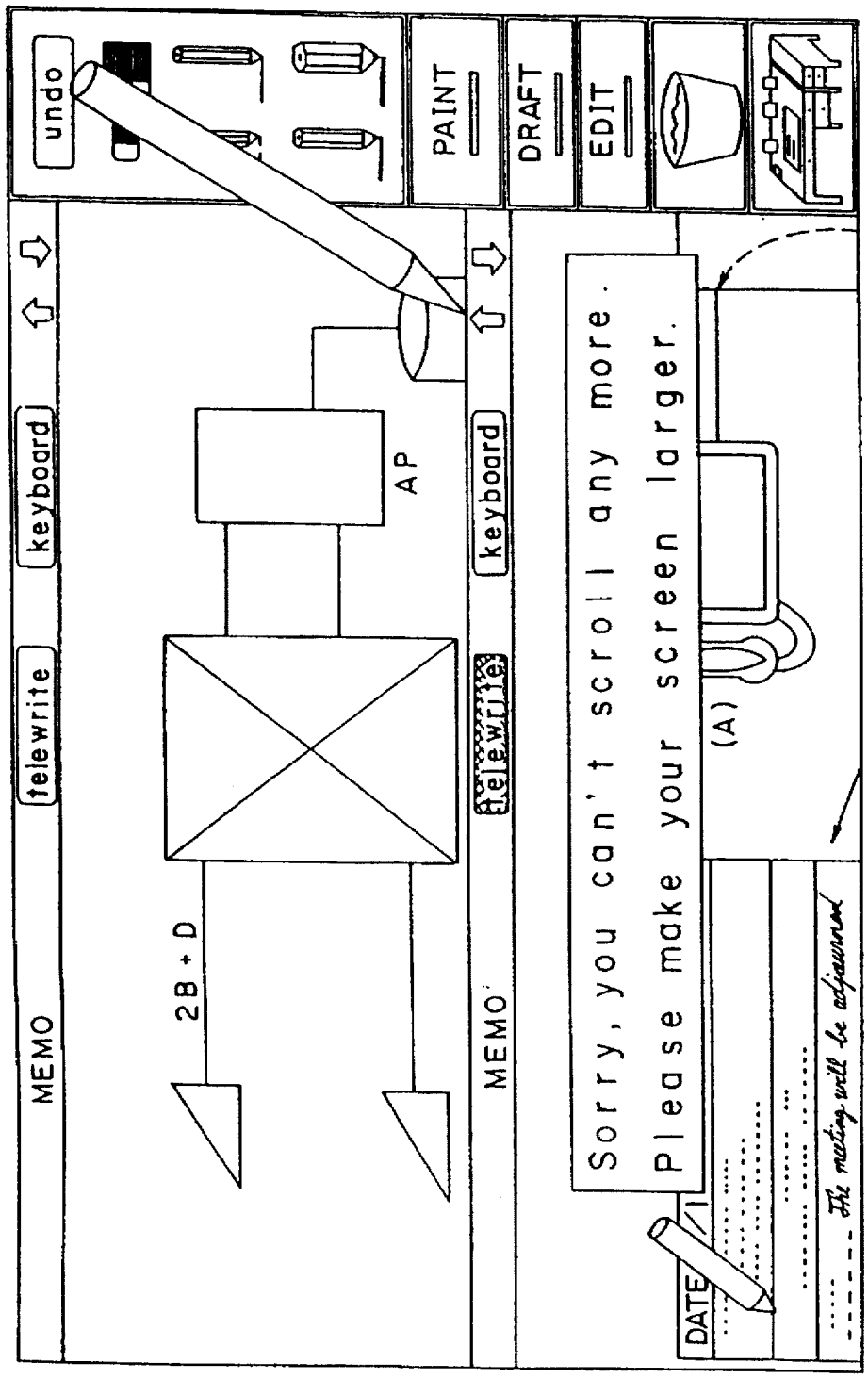

User B pen-touches a menu bar with input-pen 18 and draws up the document from user A as shown in FIG. 23C. As user B's window is smaller than user A's, only the upper part of user A's screen (FIG. 22A) is displayed on user B's screen. If user B pen-touches the downward scroll button, the screens of both user A and user B are scrolled down as illustrated in FIGS. 22B and 23D, respectively. FIG. 23D shows that when user A's screen reaches the end of the document as shown in FIG. 22B, and cannot be scrolled further. This causes a guidance display on the B terminal which indicates that further scrolling is impossible as illustrated in FIG. 23D.

Figure 24A:
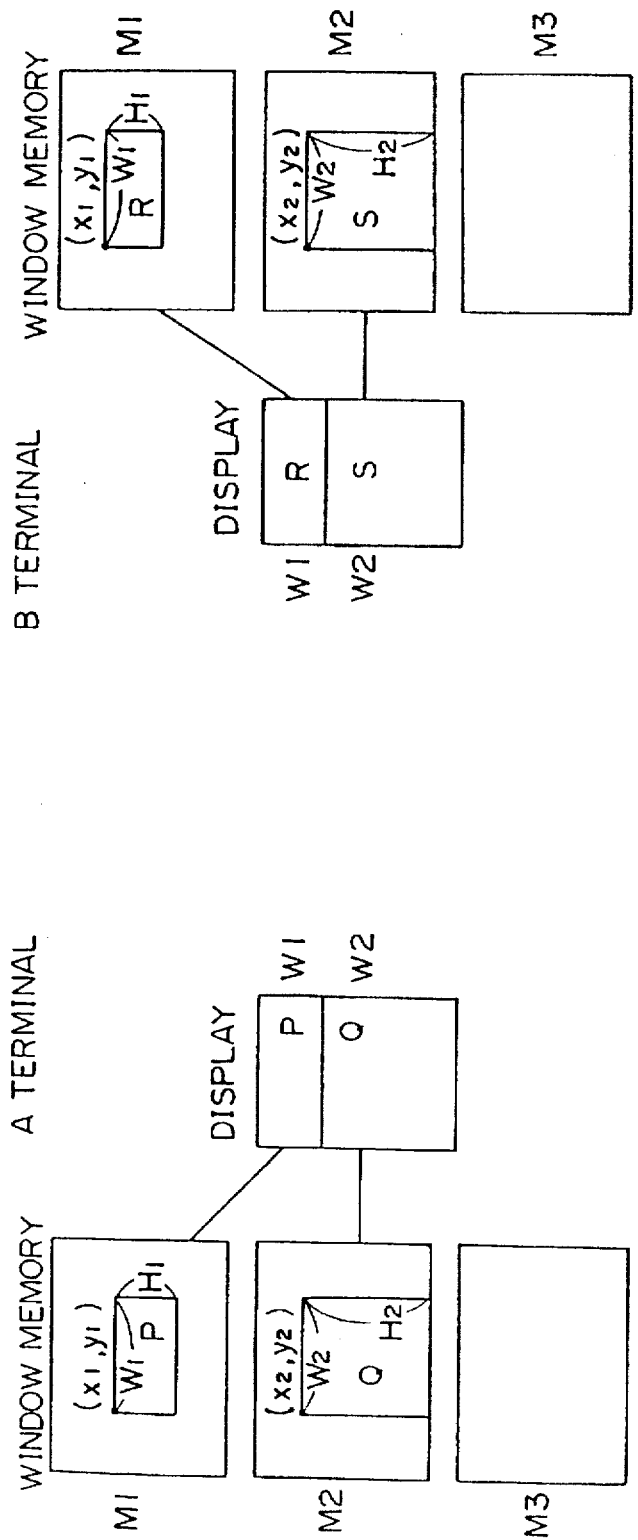
FIGS. 24A to 24F show the statuses of the window memory and transient window management tables in accordance with the display.

FIG. 24A–24F show a transient usage status of the window memory and the window management table corresponding to the window display. FIG. 24A shows an initial state. The left side is, for example, the A terminal and the right side is, for example, the B terminal. Two windows W1 and W2 are used locally and the contents "P" and "Q" of the windows W1 and W2 are respectively stored in window memories M1 and M2. The widow display parameters, data for designating whether the window is in communication, local or not used and the window number of the other terminal in communication, and the address of the window memory in the own terminal, i.e. the memory number, are stored in the window management table in the A terminal. The display parameters are coordinates X1 and Y1 on the upper left point of the display area, the horizontal width W1 and the vertical (height) width H1 of the display area in which the window is displayed on a screen of the terminal. In FIG. 24A, the window W1 is stored in memory M1 at the B terminal. The coordinates of the upper left point of the display area are X1 and Y1, its horizontal width is W1, and its height is H1. W1 is used locally and the contents thereof are denoted by "R". The window W2, stored in memory M2, is similarly used locally.

Figure 24B:
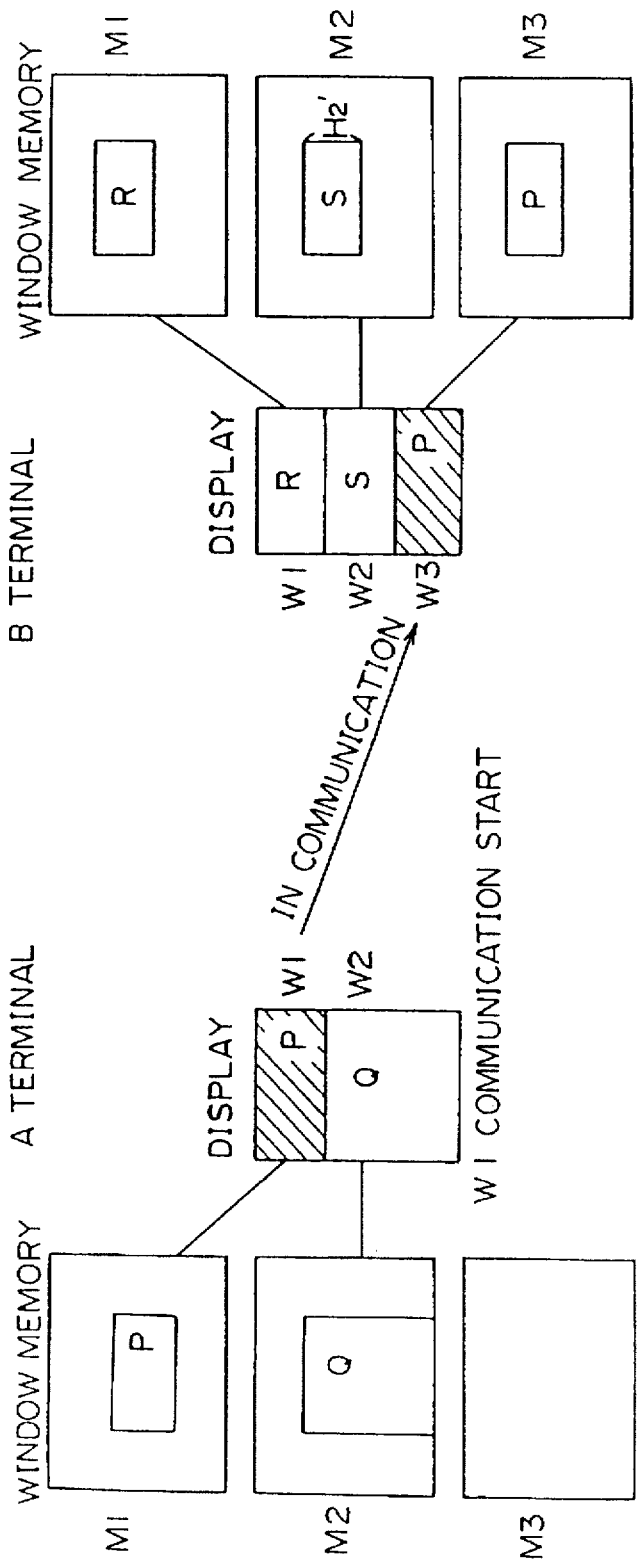
Figure 24C:
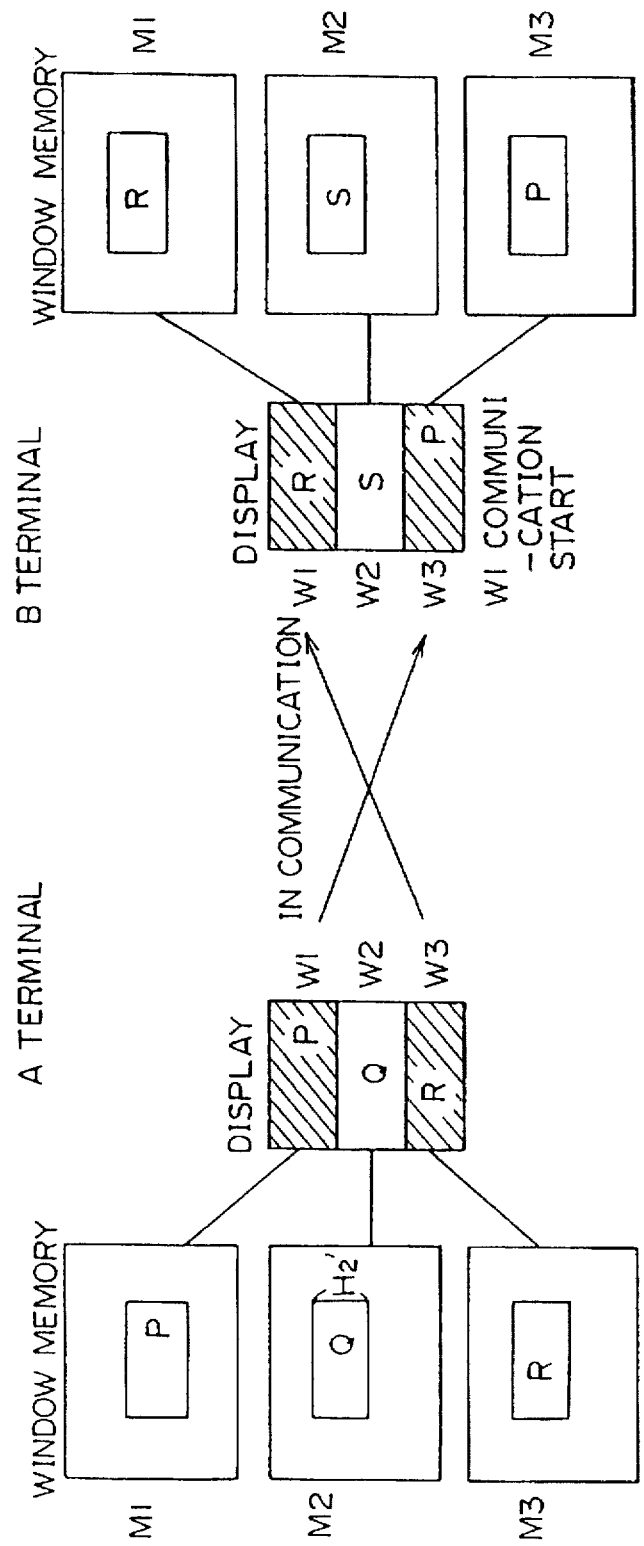
Figure 24D:
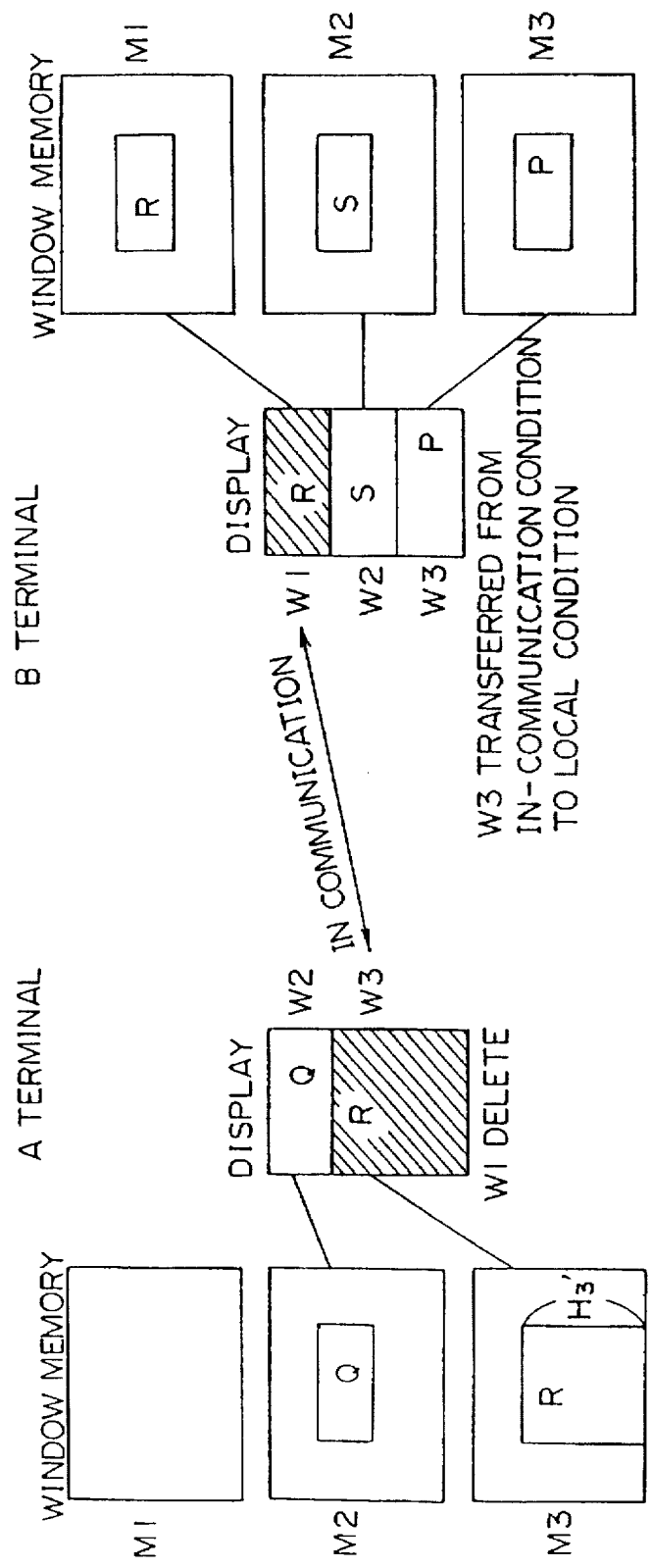

FIG. 24B shows the state in which window W1 of the A terminal is in communication with the window W3 of the B terminal. A telewriting start request is produced at the A terminal using the window W1 and a new window W3 is opened in memory M3 at the B terminal, which is not used for the B terminal in FIG. 24A. The contents "P" of window W1 of the A terminal which are transmitted from the A terminal are stored and displayed on the display of the B terminal. The window W1 in the management table of the A terminal is put in an in-communication status and the window number of the other party is W3. On the other hand, window W3 of the B terminal is used for communication, and when its status is designated as in-communication, the window number of the other party becomes W1. FIG. 24C shows a configuration in which a telewriting start request is produced at the B terminal using window W1 and the B terminal becomes in-communication with newly provided window W3 in the A-terminal side. Thus, the content of the window W3 of the A terminal becomes "R". Then, window W1 in the management table in the B terminal is put in "in-communication" status and the window number of the other party becomes W3. Window number W3 in the management table in the A terminal is put in "in-communication" status and the window number of the other party becomes W1. FIG. 24D shows a configuration in which a communication between W1 in the A terminal and W3 in the B terminal, as shown in FIG. 24C, is completed. The content "P" is deleted from the A terminal and the B terminal becomes local. Accompanying this, window W3 of the management table of the B-terminal becomes local. "Q" of window W2 and "R" of window W3 are displayed at the A terminal.

Figure 24E:
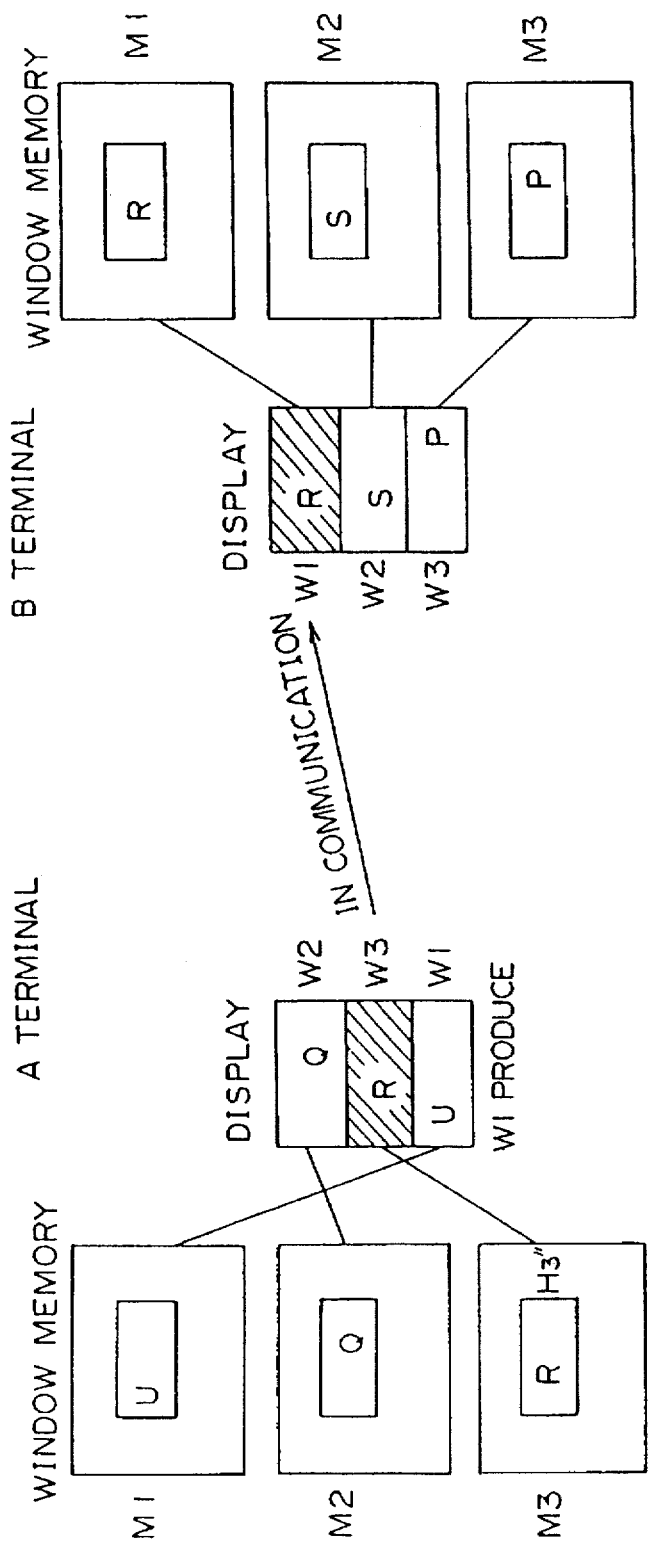

FIG. 24E shows a configuration in which a new window W 1 is created at the A terminal. Its content is "U" and its communication status is local.

Figure 24F:
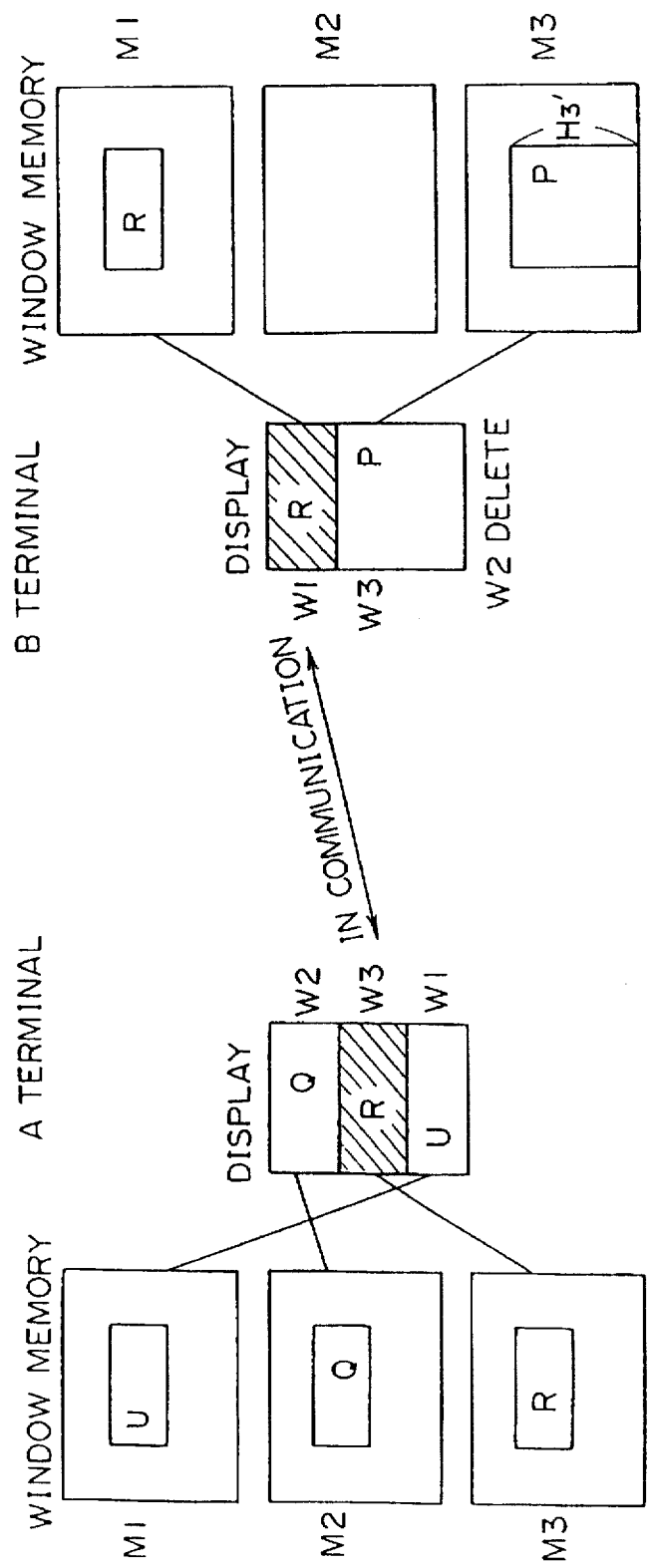

FIG. 24F shows a configuration in which a window W2 at the B terminal as shown in FIG. 25E is deleted, and "R" is displayed in window W1 and "P" is displayed in window W3.

FIGS. 25A–25F show window management tables for an alternative embodiment of the screen configurations shown in FIG. 24, with the memory address as a reference. The window numbers correspond to the memory addresses. Thus, it is possible to communicate between multi-window telewriting terminals by using memory addresses as parameters. The party to which a communication is sent is stored in the window management table under its memory address, but not under its window number, as shown in FIG. 25. FIGS. 25A to 25F correspond to the window management table configurations shown in FIGS. 24A to 24F.

As explained above, respective windows of the multi-window telewriting terminal can be used as local windows for displaying the data of only the own terminal. They can also be used to communicate with another terminal. In addition, a plurality of windows can be used to perform a telewriting with another terminal. Therefore, it becomes possible to use multi-window telewriting, thus further increasing the effect of the telewriting service.

As explained above, scrolling of the window screen can be conducted after the scrolling of the other terminal is confirmed. Therefore, this invention facilitates a screen scrolling between different-sized terminals, and increases the usability of a terminal with a multi-window display function.

What is claimed is:

1. A multi-window communication terminal for performing communication with a remote terminal to indicate at least a part of same documents on both said multi-window communication and remote terminals, said multi-window communication and remote terminals having multi-window functions, said multi-window communication terminal comprising:

inputting means for inputting commands for a window frame change, screen scrolling and start and completion of telewriting;

command analysis means for analyzing and executing first command input data inputted by a first user at said multi-window communication terminal by said inputting means and second command input data transmitted from the remote terminal to said multi-window communication terminal upon input by a second user;

display means for displaying data under control of said command analysis means;

communication control means for transmitting and receiving signals to and from the remote terminal under control of said command analysis means; and window control means for maintaining window management data and connection and disconnection controls for simultaneously displayed windows of said multi-window communication and remote terminals displaying the same documents on said multi-window communication and remote terminals, for changing a window frame of the window displayed on said multi-window communication terminal to establish a frame size independently from a frame size of the window displayed on said remote terminal and for controlling scrolling of each window such that each of said multi-window communication and remote terminals displays the same portion of the same documents at the top-left of each of the simultaneously displayed windows, under control of the first and second command input data inputted by the first and second users, by determining whether scrolling can be performed at said multi-window communication terminal, inquiring of the remote terminal whether scrolling can be performed at the remote terminal when a determination is made that scrolling can be performed at said multi-window communication terminal and performing scrolling of the simultaneously displayed windows of said multi-window communication and remote terminals when an answer is received that scrolling can be performed at the remote terminal.

2. A multi-window communication terminal according to claim 1, further comprising a memory, operatively connected to said inputting means, said command analysis means, said communication control means and said window control means, storing documentary information, wherein said display means displays the documentary information stored in said memory in a local window on said multi-window communication terminal only, under control of said command analysis means, and wherein said communication control means transfers a document displayed in the local window designated by the first user to the remote terminal and said command analysis means changes the local window to a first communication window common to a second communication window on the remote terminal upon issuance by the first user via said input means of a telewriting start command.

3. A multi-window communication terminal according to claim 1, wherein said communication control means transmits and receives signals between said multi-window communication and remote terminals to independently control a plurality of windows on said multi-window communication and remote terminals displaying the same document common to said multi-window communication and remote terminals.

4. A multi-window communication terminal according to claim 1, further comprising a memory, operatively connected to said inputting means, said command analysis means, said communication control means and said window control means, for storing window display data, wherein said display means displays the window display data stored in said memory in a plurality of windows under control of said command analysis means; and wherein said window control means maintains the window management data to change a window frame and scroll a window screen independently with regard to the plurality of windows on said multi-window communication and remote terminals displaying the document common to said multi-window communication and remote terminals, under control of the window management data and said command analysis means.

5. A multi-window communication terminal according to claim 1, wherein said communication control means transmits and receives signals to and from the remote terminal under control of said command analysis means, the signals designating a window to be used for communication by a window identifier maintained by said window control means.

6. A multi-window communication terminal according to claim 1, wherein said communication control means transmits and receives signals to and from another terminal under control of said command analysis means, the signals designating a window to be used for communication at said multi-window communication terminal by using a memory address.

7. A multi-window communication terminal according to claim 1, wherein said window control means maintains the window management data and controls a frame size of a window to a discretional frame having a width less than that of a document frame and controls scrolling in the simultaneously displayed windows displaying the document common to said multi-window communication and remote terminals, under control of said command analysis means.

8. A multi-window communication terminal according to claim 1, wherein said window control means maintains window management data to change a window frame and to control scrolling of a locally displayed one of the simultaneously displayed windows in both vertical and horizontal directions for the document common to said multi-window communication and remote terminals.

9. A multi-window communication terminal as recited in claim 1, wherein said inputting means includes means for inputting a hand-drawn image and function execution commands, and wherein said communication control means includes means for enabling independent control of at least one commonly displayed image in at least one pair of the simultaneously displayed windows of said multi-window communication and remote terminals.

10. A multi-window communication terminal according to claim 9, wherein said window control means maintains the window management data for changing a window frame and for controlling, under control of the window management data and said command analysis means, simultaneous scrolling in each of the at least one pair of the simultaneously displayed windows displaying the at least one commonly displayed image at the first and second terminals to maintain at the top-left corner of the at least one pair of the simultaneously displayed windows respectively identical portions of the at least one commonly displayed image, with scrolling in the at least one pair of the simultaneously displayed windows independent of any other pairs of the simultaneously displayed windows.

11. A multi-window communication system for performing communication between terminals for performing a multi-window control to indicate at least a part of same documents on each window at least two of the terminals, each of the terminals comprising:

a memory for storing documents, including at least one of the same documents;

means for inputting local commands for a plurality of window displays, screen scrolling and start and completion of telewriting;

command analysis means for analyzing and executing remote commands inputted at another terminal and transmitted therefrom;

display means for displaying at least a part of the documents stored in said memory in the window under control of said command analysis means and for controlling a location for display of the window on the terminal independently from a location for display of the window on the other terminal;

transmitting and receiving means for transmitting and receiving signals to and from the other terminal, under control of said command analysis means; and window management means for retaining window management data and performing window management of window screen scrolling, under control of the window management data and the remote commands from the other terminal executed by said command analysis means to indicate at least a part of the at least one of the same documents when displayed on the other terminal.

12. A multi-window communication system according to claim 11, wherein said terminal displays window display data stored in a memory on a communication window used for communication with another terminal and on a local window under the control of said command analysis means, to allow said data to be inspected by an originating terminal only.

13. A multi-window communication system according to claim 11, wherein said transmitting and receiving means transmits and receives signals under the control of said command analysis means, to independently control a plurality of windows to or from another terminal.

14. A multi-window communication system according to claim 11, wherein said display means displays window display data stored in a memory on a plurality of windows, under the control of said command analysis means, and said window management means maintains window management data under the control of said window management means, and scrolls a window screen independently with regard to a plurality of windows under the control of said window management data and said command analysis means.

15. A multi-window communication system according to claim 11, wherein said transmitting and receiving means transmits and receives signals to or from another terminal under the control of said command analysis means, said signals designating a window to be used for communication at an originating terminal by using a window identifier.

16. A multi-window communication system according to claim 11, wherein said transmitting and receiving means transmits and receives signals to or from another terminal under the control of said command analysis means, said signals designating a window to be used for communication at an originating terminal by using a memory address.

17. A multi-window communication system according to claim 11, wherein said window management means maintains window management data and controls scrolling of a window screen in both vertical and horizontal directions.

18. A method of controlling window screen scrolling in communication between first and second terminals to indicate at least a part of a same document in a window on each of the first and second terminals, said method comprising the steps of:

(a) providing the first and second terminals with a scrolling confirming flag designating that scrolling a window screen is being confirmed at the second terminal and the first terminal, respectively;

(b) determining whether scrolling of a first window screen is possible at the first terminal;

(c) turning on the scrolling confirming flag at the first terminal;

(d) transmitting a scrolling confirmation request from the first terminal to the second terminal;

(e) determining, at the second terminal, whether the scrolling confirming flag at the second terminal is on;

(f) returning a scrolling impossible signal from the second terminal to the first terminal if the scrolling confirming flag in the second terminal is on when the scrolling confirmation request is received from the first terminal;

(g) determining, at the second terminal, whether scrolling of a second window screen in the second terminal, corresponding to the first window, is possible, based on a size of the second window screen controlled independently from a size of the first window screen, if the scrolling confirming flag in the second terminal is off when the scrolling confirmation request is received from the first terminal;

(h) returning a scrolling impossible signal from the second terminal to the first terminal when the scrolling in the second terminal is determined to be impossible in step (g);

(i) performing, in the second terminal, scrolling of the document in the second window screen when the scrolling in the second terminal is determined to be possible in step (g);

(j) returning the scrolling possible signal from the second terminal to the first terminal when the scrolling in the second terminal is determined to be possible in step (g); and (k) performing, in the first terminal, scrolling of the document in the first window screen when the scrolling possible signal is returned from the second terminal.

19. A method according to claim 18, wherein said determining in step (g) includes the sub-step of determining whether scrolling is possible at a lower limit of the window screen.

20. A method according to claim 18, wherein said determining in step (g) includes the sub-step of determining whether scrolling is possible at an upper limit of the window screen.

21. A method according to claim 18, wherein said determining in step (g) includes the sub-step of determining whether scrolling is possible at a left limit of the window screen.

22. A method according to claim 18, wherein said determining in step (g) includes the sub-step of determining whether scrolling is possible at a right limit of the window screen.

23. A system of controlling a window screen scrolling in a communication between first and second terminals to display at least a part of a same document in first and second variable frame windows on the first and second terminals, respectively, said system comprising:

first means for determining, at the first terminal, whether scrolling of the first variable frame window is possible at the first terminal, for turning on a scrolling confirming flag designating that scrolling of the second variable frame window is being confirmed, and for transmitting a scrolling request from the first terminal to the second terminal;

second means for determining, at the second terminal, a content of a scrolling confirming flag of the second terminal;

means for returning a scrolling impossible signal from the second terminal to the first terminal when the scrolling confirming flag in the second terminal is on;

means for determining, at the second terminal, whether scrolling of the second variable frame window on the second terminal is possible, based on a size of the second variable frame window controlled independently from a size of the first variable frame windows, when the scrolling confirming flag in the second terminal is off;

means for returning the scrolling impossible signal from the second terminal to the first terminal when scrolling in the second terminal is determined to be impossible;

means for performing, in the second terminal, scrolling of the document in the second variable frame window when scrolling in the second terminal is determined to be possible and the scrolling request is received from the first terminal;

means for returning a scrolling possible signal from the second terminal to the first terminal when scrolling in the second terminal is determined to be possible; and means for performing, in the first terminal, scrolling of the document in the first variable frame window when it is determined that scrolling is possible therein and the scrolling possible signal is received from the second terminal.

24. A screen scrolling control system according to claim 23, wherein
the first and second terminals include means for determining whether or not a scrolling is possible at a lower limit of the window screen.

25. A screen scrolling control system according to claim 23, wherein
the first and second terminals include means for determining whether or not a scrolling is possible at an upper limit of the window screen.

26. A screen scrolling control system according to claim 23, wherein
the first and second terminals include means for determining whether or not a scrolling is possible at a left limit of the window screen.

27. A screen scrolling control system according to claim 23, wherein
the first and second terminals include means for determining whether or not a scrolling is possible at a right limit of the window screen.

28. A multi-window telewriting system including first and second terminals performing communication to indicate an image on both of the first and second terminals, each comprising:
inputting means for inputting a hand-drawn image and function execution commands;
control means for analyzing and executing commands, including a first command input by said inputting means in the first terminal and a second command transmitted from the second terminal;
display means for displaying a plurality of windows under control of said control means, including communication windows at the first and second terminals used for telewriting between the first and second terminals and a local window used at the first terminal and for controlling a location for display of the communication window on the first terminal independently from a location for display of the communication window on the second terminal;

transmitting and receiving means for transmitting and receiving picture information, associated with the communication windows, between the first and second terminals, under control of said control means, said transmitting and receiving means of the first terminal transmitting a request to the second terminal to start telewriting between the communication windows of the first and second terminals; and window management means for managing the communication windows, said window management means of the first terminal using the picture information received from the second terminal by said transmitting and receiving means of the first terminal to indicate at least a part of the image on the first terminal and said window management means of the second terminal searching for one of the windows of the second terminal to be designated and used as the communication window at the second terminal in response to the request to start telewriting transmitted via said transmitting and receiving means.

29. A multi-window telewriting system according to claim 28,
wherein said window management means searches for one of the windows of the second terminal in response to the request transmitted via said transmitting and receiving means from the first terminal to start telewriting, and
wherein said transmitting and receiving means returns a receipt of a telewriting signal to the first terminal using a window identifier of the one of the windows as a parameter identifying the communication window of the second terminal when the one of the windows has been found, said window management means maintaining a relationship between the one of the windows and the communication window of the first terminal.

30. A multi-window telewriting system according to claim 29,
wherein each of the first and second terminals further comprises a memory, operatively connected to said inputting means, said control means, said transmitting and receiving means and said window management means, to store the picture information,
wherein said display means of the first terminal displays the picture information stored in said memory in the local window at the first terminal, under control of said control means,
wherein said transmitting and receiving means of the first terminal transmits the picture information displayed in the local window designated by a user to the one of the windows of the second terminal, and
wherein said window management means of the first terminal changes the local window to the communication window.

31. A multi-window system according to claim 28,
wherein said window management means searches for one of the windows of the second terminal in response to the request transmitted via said transmitting and receiving means from the first terminal to start telewriting, and
wherein said transmitting and receiving means returns a telewriting acknowledgement signal to the first terminal using a memory address of the one of the windows as a parameter of a communication window of the second terminal when said window has been found, and then transmits and receives the picture information between the first and second terminals.

32. A multi-window system according to claim 28, wherein
said transmitting and receiving means of the first terminal sends to the second terminal for independent processing, a first request to start telewriting and a second request for searching for one of the windows displayed at the second terminal, and transmits, together with said transmitting and receiving means of the second terminal, a window identifier of the one of the windows searched by the request for searching and the picture information, between the first and second terminals.

33. A multi-window telewriting system according to claim 28, wherein said transmitting and receiving means transmits and receives window data including window identifiers of the communication windows of the first and second terminals for performing the telewriting between the communication windows corresponding to the window identifiers.

34. A multi-window telewriting system according to claim 28, wherein said transmitting and receiving means of the first terminal sends to the second terminal for independent processing, a request for start of telewriting and a request for searching for one of the windows displayed at the second terminal, and transmits, together with said transmitting and receiving means of the second terminal, a memory address of the one of the windows located by the request for searching and the picture information, between the first and second terminals.

35. A multi-window telewriting system as recited in claim 28,
wherein said window management means of the second terminal designates the one of the windows as the communication window of the second terminal by transmitting a window identifier of the one of the windows to the first terminal via said transmitting and receiving means, and
wherein said window management means of the first and second terminals maintain the window identifier of the one of the windows and a window identifier of the communication window of the first terminal as a pair of window identifiers for communication between the communication windows using the pair of window identifiers.

36. A telewriting terminal for performing telewriting with another terminal to indicate a hand-drawn image on both the telewriting and other terminals, comprising:
input means for manually inputting the hand-drawn image and local commands for a window frame change, window screen scrolling, mode conversion and start and completion of telewriting;
command analysis means for analyzing and executing the local commands input from said input means and remote commands transmitted from the other terminal;
display means for displaying window display data stored in a memory, under control of said command analysis means and for controlling a location for display of a window on the telewriting terminal independently from a location for display of a corresponding window on the other terminal;
transmitting and receiving means for transmitting and receiving signals between said telewriting terminal and the other terminal, under control of said command analysis means; and
window management means for retaining window management data and controlling the window frame change and the window screen scrolling to keep the image on said display means identical to the image displayed on the other terminal, based on the window management data and under control of the local and remote commands from said input means and the other terminal executed by said command analysis means.

37. The telewriting terminal according to claim 36, wherein
said terminal displays window display data stored in the memory on a communication window used for communication with another terminal and on a local window for inspection by only the telewriting terminal, under the control of said command analysis means.

38. A telewriting terminal according to claim 36, wherein
said transmitting and receiving means transmits and receives signals to independently control a plurality of windows to and from another terminal under the control of said command analysis means.

39. A telewriting terminal according to claim 36, wherein
said display means displays window display data stored in a memory on a plurality of windows under the control of said command analysis means, and said window management means maintains window management data, changes a window frame, and scrolls window screens independently with regard to a plurality of windows, under the control of said window management data and said command analysis means.

40. A telewriting terminal according to claim 36, wherein
said transmitting and receiving means transmits and receives signals to or from another terminal under the control of said command analysis means, said signals designating a window to be used for communication in the telewriting terminal by a window number.

41. A telewriting terminal according to claim 36, wherein
said transmitting and receiving means transmits and receives signals to and from the other terminal under the control of said command analysis means, said signals designating a window to be used for communication in an originating terminal by using a memory address.

42. A telewriting terminal according to claim 36,
wherein said command analysis means controls a search for an existing window of the telewriting terminal in response to a request received by said transmitting and receiving means for a start of telewriting from the other terminal and returns an acknowledgment of the request for telewriting using a window number of the existing window as a parameter, and
wherein said transmitting and receiving means transmits a signal including picture information between the telewriting and other terminals.

43. A telewriting terminal according to claim 36,
wherein said command analysis means controls a search for an existing window of the telewriting terminal in response to a request received by said transmitting and receiving means for a start of telewriting from the other terminal and returns an acknowledgment of the request for telewriting using a memory address of the existing window as a parameter, and
wherein said transmitting and receiving means transmits signals including picture information between the telewriting and other terminals.

44. A terminal according to claim 36, wherein
under the control of said command analysis means, said transmitting and receiving means independently sends to another terminal requests to start telewriting and to search a window, and transmits and receives between terminals, a window number of the searched window and the picture information.

45. A telewriting terminal according to claim 36, wherein under control of said command analysis means, said transmitting and receiving means independently sends to the other terminal requests to start telewriting and to search for an existing window, and transmits and receives between the telewriting and other terminals a memory address of the existing window and picture information.

46. A window screen scrolling control method used in communication between image telewriting communication terminals to indicate at least a part of a same document on first and second windows displayed by first and second terminals, respectively, said window screen scrolling control method comprising the steps of:

(a) providing the first and second terminals with a scrolling confirming flag designating that scrolling has been requested;

(b) determining, in the first terminal, whether scrolling of the first window displayed by the first terminal is possible, and turning on a scrolling confirming flag in the first terminal if scrolling is possible;

(c) transmitting a scrolling request from the first terminal to the second terminal when scrolling is determined to be possible in step (b);

(d) determining, in the second terminal, the content of the scrolling confirming flag of the second terminal;

(e) returning a scrolling impossible signal from the second terminal to the first terminal if the scrolling confirming flag of the second terminal is on when the scrolling request is received from the first terminal;

(f) determining, in the second terminal, whether scrolling of the second window displayed by the second terminal is possible, based on a size of the second window controlled independently from a size of the first window, if the scrolling confirming flag of the second terminal is off when the scrolling request is received from the first terminal;

(g) returning a scrolling impossible signal from the second terminal to the first terminal when scrolling of the second window displayed by the second terminal is determined to be impossible in step (f);

(h) performing, in the second terminal, screen scrolling when scrolling of the second window displayed by the second terminal is determined to be possible in step (f);

(i) returning a scrolling possible signal from the second terminal to the first terminal when scrolling of the window in the second terminal is determined to be possible in step (f); and (j) performing scrolling of the first window displayed by the first terminal when scrolling of the first and second windows is determined to be possible.

47. A window screen scrolling control method according to claim 46, wherein said determining in step (f) includes the sub-step of determining whether scrolling is possible at a lower limit of the second window.

48. A window screen scrolling control method according to claim 46, wherein said determining in step (f) includes the sub-step of determining whether scrolling is possible at an upper limit of the second window.

49. A window screen scrolling control method according to claim 46, wherein said determining in step (f) includes the sub-step of determining whether scrolling is possible at a left limit of the second window.

50. A window screen scrolling control method according to claim 46, wherein said determining in step (f) includes the sub-step of determining whether scrolling is possible at a right limit of the second window.

51. A communication terminal in a communication system for performing communication with another communication terminal, said communication terminal and the other communication terminal each displaying a plurality of communication windows, said communication terminal comprising:

inputting means for inputting control commands for data;

command analyzing means for analyzing a first command inputted by said inputting means and a second command transmitted from the other communication terminal and for executing the first and second commands;

display means for displaying the data in each communication window and for controlling a location for display of the communication window on the communication terminal independently from a location for display of the communication window is displayed on the other communication terminal;

communication control means for transmitting to and receiving from the other communication terminal window identifying information of the plurality of communication windows under control of said command control means; and window management means for storing window management data, and for controlling display of the data in each communication window using the window identifying information independently for each communication window under control of said command analyzing means.

52. The communication terminal according to claim 51, wherein said display means includes a memory storing the data displayed on said communication terminal in one of the communication windows used for communication with the other communication terminal and in a local window of said communication terminal, under control of said command analyzing means.

53. The communication system according to claim 51, wherein said display means includes a memory storing the data displayed on said communication terminal in a plurality of windows under control of said command analyzing means.

54. The multi-window communication terminal according to claim 51, wherein said communication control means transmits to and receives from the other communication terminal a signal for designating a window used on said communication terminal for communication with the other communication terminal using a window number under control of said command analyzing means.

55. The communication terminal according to claim 51, wherein said communication control means transmits to and receives from the other communication terminal a signal for designating one of the communication windows on said communication terminal for communication with the other communication terminal using a memory address of the one of the communication windows under control of said command analyzing means.

56. The communication terminal according to claim 51, wherein said window management means changes a window frame size of one of the communication windows to any frame size which is smaller than a document frame size and controls scrolling in the one of the communication windows under control of said command analyzing means.

57. The communication terminal according to claim 51, wherein said window management means changes a window frame and controls scrolling in any of vertical and horizontal directions.

58. A communication terminal in a communication system for performing document communication with another communication terminal using a plurality of communication windows, said communication terminal comprising:

inputting means for inputting at least a command for executing a variety of functions of said communication terminal;

command analyzing means for analyzing a first command inputted by said inputting means and a second command transmitted from the other communication terminal and for executing the first and second commands;

display means for displaying in each communication window at least a part of a document displayed in a corresponding communication window on the other communication terminal and for controlling a location for display of each communication window on the communication terminal independently from a location of the corresponding communication window on the other communication terminal;

communication control means for transmitting to and receiving from the other communication terminal, window identifying information of the plurality of communication windows used for communication with the other communication terminal under control of said command analyzing means; and window management means for storing window management data and for controlling execution of the functions of said communication terminal using the window identifying information independently for each communication window under control of said command analyzing means.

59. The communication terminal according to claim 58, wherein said display means displays data stored in a memory of said communication terminal in a plurality of windows, and wherein said window control means controls a designated communication window among the communication windows based on the window management data and under control of said command analyzing means.

60. The communication terminal according to claim 58, wherein said communication control means transmits to and receives from the other communication terminal a signal for designating one of the communication windows on said communication terminal for communication with the other communication terminal using a window number under control of said command analyzing means.

61. The communication terminal according to claim 58, wherein said communication control means transmits to and receives from the other communication terminal a signal for designating one of the communication windows on said communication terminal for communication with the another communication terminal using a memory address of the one of the communication windows under control of said command analyzing means.

62. A communication terminal in a communication system for performing document communication with another communication terminal using a plurality of communication windows, said communication terminal comprising:

storing means for storing communication window identifying information assigned to each of a plurality of communication windows opened on said communication terminal and having a correspondence with communication windows opened on the other communication terminal;

analyzing means for analyzing control commands for a document displayed in the plurality of communication windows;

communication window control means for controlling the document displayed in the communication windows on the communication terminal under control of said analyzing means and for controlling a location for display of the communication window on the communication terminal independently from a location for display of the window on the other communication terminal; and sending means for sending communication window identifying information corresponding to the communication window that is obtained from said storing means together with control information for the document to the remote terminal under control of said analyzing means.

63. A communication terminal in a communication system for performing document communication with another communication terminal using a plurality of communication windows, said communication terminal comprising:

storing means for storing communication window identifying information assigned to each of a plurality of communication windows opened on said communication terminal and having a correspondence with communication windows opened on the other communication terminal;

receiving means for receiving communication window identifying information and control information for a document from the other communication terminal;

analyzing means for analyzing the control information for the document received by said receiving means; and communication window control means for controlling the document displayed in a designated communication window corresponding to the communication window identifying information under control of said analyzing means and for controlling a location for display of the communication window on the communication terminal independently from a location display of the communication window on the other communication terminal.

64. A communication terminal in a communication system for performing data information communication with another communication terminal using a communication window, said communication terminal comprising:

sending means for sending first communication window identifying information which identifies a designated communication window on said communication terminal for communication with the other communication terminal, upon receiving a request for starting communication with the other communication terminal;

receiving means for receiving second communication window identifying information of a corresponding communication window on the other communication terminal from the other communication terminal in response to the first communication window identifying information sent by said sending means;

window information management means for managing the first communication window identifying information on said communication terminal corresponding to the second communication window identifying information received by said receiving means; and transmitting means for transmitting data displayed in the designated communication window on said communication terminal to the other communication terminal under control of said window information management means.

65. The communication terminal according to claim 64, further comprising:

command analyzing, means for analyzing control commands inputted for each communication window;

window control means for controlling the data displayed in the communication window on said communication terminal under control of said command analyzing means; and notifying means for providing the first communication window identifying information on said communication terminal and control information for the data information to the other communication terminal under control of said command analyzing means.

66. A communication terminal in a communication system for performing communication with another communication terminal, said communication terminal comprising:

setting means for setting a call communication between said communication terminal and the other communication terminal by issuing a call to the other communication terminal;

window displaying means for generating a local window on the communication terminal and displaying data in the local window;

sending means for sending window identifying information on the local window to the other communication terminal in response to a request for starting communication with the other communication terminal;

receiving means for receiving communication window identifying information of a first communication window on the other communication terminal from the other communication terminal in response to the window identifying information on the local window sent by said sending means;

window information management means for managing the window identifying information on the local window as communication window identifying information corresponding with the communication window identifying information received from the other communication terminal and for recognizing the local window as a second communication window; and transmitting means for transmitting the data displayed in the second communication window on said communication terminal to the other communication terminal.

67. The communication terminal according to claim 66, further comprising:

command analyzing means for analyzing control commands inputted for each communication window;

window control means for controlling the data displayed in the second communication window on said communication terminal under control of said command analyzing means; and notifying means for notifying the communication window identifying information on said communication terminal and control information for the data to the other communication terminal under control of said command analyzing means.

68. A communication terminal in a communication system for performing, communication with another communication terminal, said communication terminal comprising:

window displaying means for generating a first communication window on the communication terminal and displaying data to be communicated with the other communication terminal;

communication window controlling means for controlling information sent from the other communication terminal and displayed on the first communication window on said communication terminal;

sending means for sending communication window identifying information corresponding to the first communication window on said communication terminal to the other communication terminal in response to a request for terminating the communication with the other communication terminal using the first communication window on said communication terminal; and window information management means for deleting communication window identifying information of a second communication window on the other communication terminal stored and managed in correspondence with the communication window identifying information of the first communication window on said communication terminal and for managing the first communication window on said communication terminal as a local window.

69. A communication terminal in a communication system for performing data information communication with another communication terminal using a communication window, said communication terminal comprising:

window size control means for controlling a size of the communication window independently from a size of the communication window displayed on the other communication terminal;

scroll instructing means for instructing a scrolling operation of data displayed in the communication window;

scrolling means for scrolling the data in the communication window upon receiving an instruction for scrolling the data from said scroll instructing means;

storing means for storing position information on the data corresponding to a particular portion in the communication window;

position information notifying means for notifying the other communication terminal of the position information stored in said storing means obtained from the scrolling of the data controlled by said scrolling means;

position information receiving means for receiving position information on scrolling from the other communication terminal; and position changing means for changing a display location of the data in the communication window based on the position information received by said position information receiving means.

70. The communication terminal according to claim 69, wherein said storing means stores the position information on the data for one of four corners of the communication window.

71. The communication terminal according to claim 69, wherein said storing means stores the position information on the data for one of four sides of the communication window.

72. A communication terminal in a communication system for performing data information communication with another communication terminal using a communication window, the data being displayed in the communication window, said communication terminal comprising:

window size control means for controlling a size of the communication window independently from a size of the communication window displayed on the other communication terminal;

inputting means for inputting a request for scrolling the data displayed in a first communication window;

sending means for sending a scrolling confirmation request for inquiring whether scrolling at a second communication window on the other communication terminal can be performed to the other communication terminal in response to the request from said inputting means;

receiving means for receiving a response signal indicating whether scrolling at the second communication window on the other communication terminal can be performed;

scrolling control means for performing scrolling at the first communication window if the response signal indicates that scrolling can be performed, and for prohibiting scrolling at the first communication window if the response signal indicates that scrolling can not be performed; and scroll information notifying means for notifying the other communication terminal of scroll information on the first communication window.

73. A communication terminal in a communication system for performing data communication with another communication terminal using a communication window, the data being displayed in the communication window, said communication terminal comprising:

window size control means for controlling a size of the communication window independently from a size of the communication window displayed on the other communication terminal;

receiving means for receiving a scrolling confirmation request for data displayed in a communication window from the other communication terminal;

determination means for determining whether scrolling the data in the communication window can be performed, upon receiving the scrolling confirmation request from said receiving means;

sending means for sending a determination result obtained by said determination means as a response signal for the scrolling confirmation request to the other communication terminal; and scrolling control means for scrolling the data displayed in the communication window based on the scrolling confirmation request from the other communication terminal.

74. The communication terminal according to claim 73, wherein said determination means determines whether the scrolling can be performed at a lower limit of the communication window.

75. The communication terminal according to claim 73, wherein said determination means determines whether the scrolling can be performed at an upper limit of the communication window.

76. The communication terminal according to claim 73, wherein said determination means determines whether the scrolling can be performed at a left limit of the communication window.

77. The communication terminal according to claim 73, wherein said determination means determines whether the scrolling can be performed at a right limit of the communication window.

* * * * *

UNITED STATES PATENT AND TRADEMARK OFFICE
CERTIFICATE OF CORRECTION

PATENT NO. : 5,726,669

DATED : March 10, 1998

INVENTOR(S) : Obata et al.

Page 1 of 2

It is certified that error appears in the above-identified patent and that said Letters Patent is hereby corrected as shown below:

Title Page, [75] Inventors: line 1, "Mitaka" should be --Tokyo--;

[56] References Cited, col. 2, line 2, "4,714,918" should have inserted --340/726--;

Col. 3, line 16, "analysis" should be --analyzing--.

Col. 6, line 41, change "a" (third occurrence) to --an--.

Col. 8, line 51, after "33." start a NEW PARAGRAPH.

Col. 9, line 40, "analysis" should be --analyzing--.

Col. 10, line 7, after "display" insert --to draw an--.

Col. 11, line 54, change "of" to --at--.

Col. 13, line 19, change "FIG." to --FIGS.--.

UNITED STATES PATENT AND TRADEMARK OFFICE
CERTIFICATE OF CORRECTION

PATENT NO. : 5,726,669

DATED : March 10, 1998

INVENTOR(S) : Obata et al.

It is certified that error appears in the above-identified patent and that said Letters Patent is hereby corrected as shown below:

Col. 24, line 45, (Claim 54, line 1), delete "multi-window".

Col. 25, line 52, (Claim 61, line 6), change "another" to --other-- .

Signed and Sealed this

First Day of September, 1998

Attest:

BRUCE LEHMAN

Attesting Officer

Commissioner of Patents and Trademarks